(12) United States Patent
Kobayashi

(10) Patent No.: US 8,200,588 B2
(45) Date of Patent: Jun. 12, 2012

(54) INFORMATION PROCESSING DEVICE, METHOD AND PROGRAM FOR SELECTING EXPRESSION CANDIDATES

(75) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 658 days.

(21) Appl. No.: 12/427,063

(22) Filed: Apr. 21, 2009

(65) Prior Publication Data

US 2009/0265291 A1    Oct. 22, 2009

(30) Foreign Application Priority Data

Apr. 20, 2008  (JP) ................. P2008-111120

(51) Int. Cl.
*G06F 15/18* (2006.01)

(52) U.S. Cl. .......................................... 706/12

(58) Field of Classification Search ................ None
See application file for complete search history.

(56) References Cited

U.S. PATENT DOCUMENTS

| 5,790,426 A | 8/1998 | Robinson | |
|---|---|---|---|
| 7,475,048 B2 * | 1/2009 | Weston et al. | 706/20 |
| 2006/0107070 A1 * | 5/2006 | Rice et al. | 713/190 |

FOREIGN PATENT DOCUMENTS

| JP | 2005-167628 | 6/2005 |
|---|---|---|
| JP | 2007-121457 | 5/2007 |
| JP | 2007-317068 | 12/2007 |

OTHER PUBLICATIONS

Abernethy et al. "A New Approach to Collaborative Filtering: Operator Estimation with Spectral Regularization", arXiv:0802.1430v2 [cs.LG], Feb. 11, 2008, pp. 23.*
Ahn "A Hybrid Collaborative Filtering Recommender System Using a New Similarity Measure", WSEAS, 2007, pp. 494-498.*
Y. Kato et al.; "A Recommender System Indicating Accurate and Subconscious Items for On-Line Shopping", Information Processing Society of Japan, vol. 46, No. SIG13 (TOD27), pp. 53-64, (2005).
Notification of Reasons for Refusal with English language translation issued by Japanese Patent Office on Dec. 1, 2009 in Japanese application No. 2008-111120.

* cited by examiner

*Primary Examiner* — Jeffrey Gaffin
*Assistant Examiner* — Li-Wu Chang
(74) *Attorney, Agent, or Firm* — Finnegan, Henderson, Farabow, Garrett & Dunner, L.L.P.

(57) ABSTRACT

An information processing device includes: a candidate generating unit employing a user evaluation matrix of evaluation values indicating evaluations as to multiple contents for multiple users to generate multiple estimated expression candidates which are candidates of an estimated expression employed for estimating an evaluation as to a content of a user; an estimation results computing unit computing the user evaluation matrix by the respective estimated expression candidates to generate an estimation result configured of a predictive evaluation value which is the estimation value of an evaluation value; and an estimated expression selecting unit, in a case where several estimation results are employed, and several estimated expression candidates are employed as estimated expressions, obtaining linear combination coefficients employed for obtaining a final estimation result, and selecting an estimated expression candidate and linear combination coefficient having the highest evaluation as the estimated expression and linear combination coefficient of the next generation.

7 Claims, 26 Drawing Sheets

FIG. 1

| R | C1 | C2 | C3 | C4 | C5 | C6 | C7 | ... | CM |
|---|----|----|----|----|----|----|----|-----|----|
| U1 | 1 | 2 |  | 4 |  |  |  |  |  |
| U2 |  |  | 3 |  |  |  |  |  | 2 |
| U3 |  | 3 |  | 2 |  | 2 |  |  |  |
| U4 | 4 |  |  |  | 5 |  |  |  |  |
| U5 |  |  | 3 | 5 | 4 |  |  |  | 4 |
| U6 | 2 |  |  |  | 5 |  |  |  |  |
| U7 |  |  | 4 |  | 5 |  |  |  | 3 |
| ... |  |  |  |  |  |  |  |  |  |
| UN |  |  |  | 4 |  |  | 5 |  |  |

Rows: USERS. Columns: CONTENTS.

FIG. 2

CONTENTS

| A | C1 | C2 | C3 | C4 | C5 | C6 | C7 | ... | CM |
|---|----|----|----|----|----|----|----|-----|----|
| U1 | 1 | 2 | 3 | 4 | 5 | 2 | 4 | | 3 |
| U2 | 2 | 2 | 3 | 4 | 5 | 2 | 3 | | 2 |
| U3 | 3 | 3 | 4 | 2 | 5 | 2 | 4 | | 3 |
| U4 | 4 | 2 | 4 | 3 | 5 | 2 | 4 | | 3 |
| U5 | 3 | 2 | 3 | 5 | 4 | 3 | 5 | | 4 |
| U6 | 2 | 3 | 3 | 5 | 5 | 3 | 4 | | 4 |
| U7 | 2 | 3 | 4 | 5 | 5 | 2 | 4 | | 3 |
| ... | | | | | | | | | |
| UN | 3 | 2 | 4 | 4 | 5 | 2 | 5 | | 3 |

USERS

U#NormalizeAvg, C#FillAvg, U:C#CF_Pearson(8), Sqrt
    W11              W12         W13              W14

FIG. 8

| OPERATOR NAME | PROCESSING CONTENT |
|---|---|
| NormalizeMaxMin | NORMALIZE WITH THE MAXIMUM VALUE AND MINIMUM VALUE |
| NormalizeAvg | NORMALIZE WITH A MEAN VALUE |
| FillMax | BLANK COLUMN IS FILLED WITH THE MAXIMUM VALUE |
| FillMin | BLANK COLUMN IS FILLED WITH THE MINIMUM VALUE |
| FillMedian | BLANK COLUMN IS FILLED WITH A MEDIAN |
| FillAvg | BLANK COLUMN IS FILLED WITH A MEAN VALUE |
| CF_Correl (num) | num MEAN VALUES FROM THE HIGHER ONE OF CORRELATION ARE TAKEN AS PREDICTIVE EVALUATION VALUES |
| CF_Pearson (num) | num MEAN VALUES FROM THE HIGHER ONE OF PEARSON CORRELATION ARE TAKEN AS PREDICTIVE EVALUATION VALUES |
| CF_Eucrid (num) | num MEAN VALUES FROM THE ONE WHERE EUCLIDEAN DISTANCE IS NEARER ARE TAKEN AS PREDICTIVE EVALUATION VALUES |
| Log, Exp, Sqrt, ETC. | EXPONENTIAL FUNCTION |
| Sin, Cos, Tan, ETC. | TRIGONOMETRIC FUNCTION |

FIG. 9A    U#NormalizeMaxMin, Sin, U;C#CF_Correl(1)

FIG. 9B    C;U#CF_Eucrid(3)

FIG. 9C    Log, C#FillAvg

FIG. 13

| | C1 | C2 | C3 | C4 | C5 | C6 | C7 | ... | CM |
|---|---|---|---|---|---|---|---|---|---|
| U1 | 0.43 | 0.86 | 0.98 | 1.71 | 1.20 | 0.86 | 1.11 | | 0.85 |
| U2 | 0.63 | 1.07 | 1.20 | 1.18 | 1.20 | 0.86 | 1.11 | | 0.80 |
| U3 | 0.63 | 1.29 | 0.98 | 0.86 | 1.20 | 0.86 | 1.11 | | 0.85 |
| U4 | 0.89 | 1.07 | 0.98 | 1.18 | 1.11 | 0.86 | 1.11 | | 0.85 |
| U5 | 0.63 | 1.07 | 0.75 | 1.25 | 1.00 | 0.86 | 1.11 | | 1.00 |
| U6 | 0.57 | 1.07 | 0.98 | 1.18 | 1.43 | 0.86 | 1.11 | | 0.85 |
| U7 | 0.63 | 1.07 | 1.00 | 1.18 | 1.25 | 0.86 | 1.11 | | 0.75 |
| ... | | | | | | | | | |
| UN | 0.63 | 1.07 | 0.98 | 0.89 | 1.20 | 0.86 | 1.11 | | 0.85 |

CORRELATION VALUES: 0.593014, 0.83773, 0.761491

FIG. 14

| | C1 | C2 | C3 | C4 | C5 | C6 | C7 | ... | CM | Correlation Values |
|---|---|---|---|---|---|---|---|---|---|---|
| U124 | 0.55 | 1.07 | 1.2 | 1.18 | 1.2 | 0.86 | 1.11 | ... | 0.85 | 0.996022 |
| U987 | 0.83 | 1.07 | 1.2 | 1.18 | 1.2 | 0.8 | 1.11 | ... | 0.85 | 0.981727 |
| U25 | 0.9 | 1.07 | 1.3 | 1.18 | 1.2 | 0.86 | 1.11 | ... | 0.85 | 0.973139 |
| U539 | 1.21 | 1.07 | 1.2 | 1.18 | 1.1 | 0.86 | 1.11 | ... | 0.85 | 0.967946 |
| U235 | 0.41 | 1.07 | 1.3 | 1.18 | 1.2 | 0.86 | 1.2 | ... | 0.85 | 0.966897 |
| U1694 | 0.88 | 1.07 | 1.1 | 1.18 | 1.1 | 0.86 | 1.11 | ... | 0.85 | 0.954325 |
| U206 | 0.52 | 1.07 | 1.2 | 1 | 1.2 | 0.86 | 1.11 | ... | 0.85 | 0.895483 |
| U83 | 0.46 | 1.07 | 0.98 | 1.18 | 1.2 | 0.86 | 1.11 | ... | 0.85 | 0.845517 |
| ... | | | | | | | | | | |
| U4 | 0.89 | 1.07 | 0.98 | 1.18 | 1.11 | 0.86 | 1.11 | ... | | 0.83773 |
| ... | | | | | | | | | | |
| U6 | 0.57 | 1.07 | 0.98 | 1.18 | 1.43 | 0.86 | 1.11 | ... | | 0.761491 |
| ... | | | | | | | | | | |
| U1 | 0.43 | 0.86 | 0.98 | 1.71 | 1.2 | 0.86 | 1.11 | ... | 0.85 | 0.593014 |

TOP EIGHT USERS (U124, U987, U25, U539, U235, U1694, U206, U83)

CORRELATION IS GREAT ←

FIG. 15

|    | C1   | C2   | C3   | C4   | C5   | C6   | C7   | ... | CM   |
|----|------|------|------|------|------|------|------|-----|------|
| U1 | 0.43 | 0.86 | 1.07 | 1.71 | 1.23 | 0.86 | 1.13 |     | 0.93 |
| U2 | 0.72 | 1.11 | 1.20 | 1.21 | 1.22 | 0.88 | 1.15 |     | 0.80 |
| U3 | 0.66 | 1.29 | 1.05 | 0.86 | 1.26 | 0.86 | 1.18 |     | 0.87 |
| U4 | 0.89 | 1.17 | 1.02 | 1.18 | 1.11 | 0.90 | 1.14 |     | 0.93 |
| U5 | 0.67 | 1.12 | 0.75 | 1.25 | 1.00 | 0.87 | 1.20 |     | 1.00 |
| U6 | 0.57 | 1.10 | 1.05 | 1.26 | 1.43 | 0.92 | 1.13 |     | 0.86 |
| U7 | 0.66 | 1.15 | 1.00 | 1.20 | 1.25 | 0.93 | 1.15 |     | 0.75 |
| ... |     |      |      |      |      |      |      |     |      |
| UN | 0.65 | 1.10 | 1.08 | 0.89 | 1.28 | 0.93 | 1.11 |     | 0.93 |

G1 = {U1, U3, U10 . . . U1520}

G2 = {U6, U8, U11 . . . U1525}

...

GQ = {U7, U16, U21 . . . U1511}

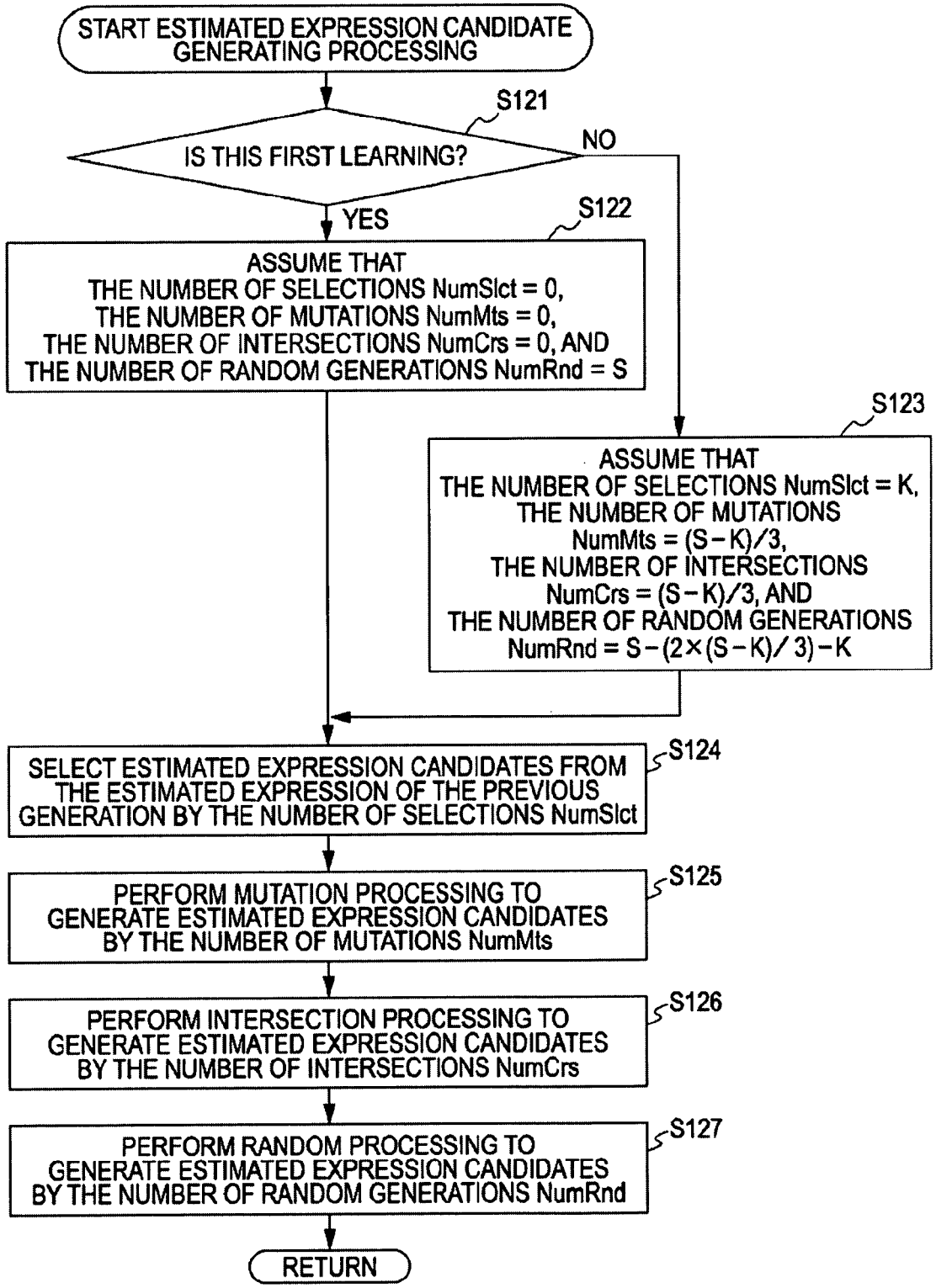

FIG. 22A  U#NormalizeMaxMin, Sin, U:C#CF_Correl(1)
              ⎵⎵⎵⎵⎵⎵⎵⎵⎵  ⎵⎵  ⎵⎵⎵⎵⎵⎵⎵⎵⎵
                  W31       W32        W33

FIG. 22B  U#NormalizeMaxMin, Sin, C#FillAvg, U:C#CF_Correl(1)

FIG. 22C  Sin, U:C#CF_Correl(1)

FIG. 22D  C#NormalizeMaxMin, Sin, U:C#CF_Correl(1)

FIG. 22E  C#NormalizeMaxMin, Sin, U:C#CF_Correl(5)

FIG. 22F  C#NormalizeMaxMin, U:C#CF_Correl(5), Sin

FIG. 25

C:U#CF_Pearson(3), Sin, U:C#CF_Correl(1), Cos

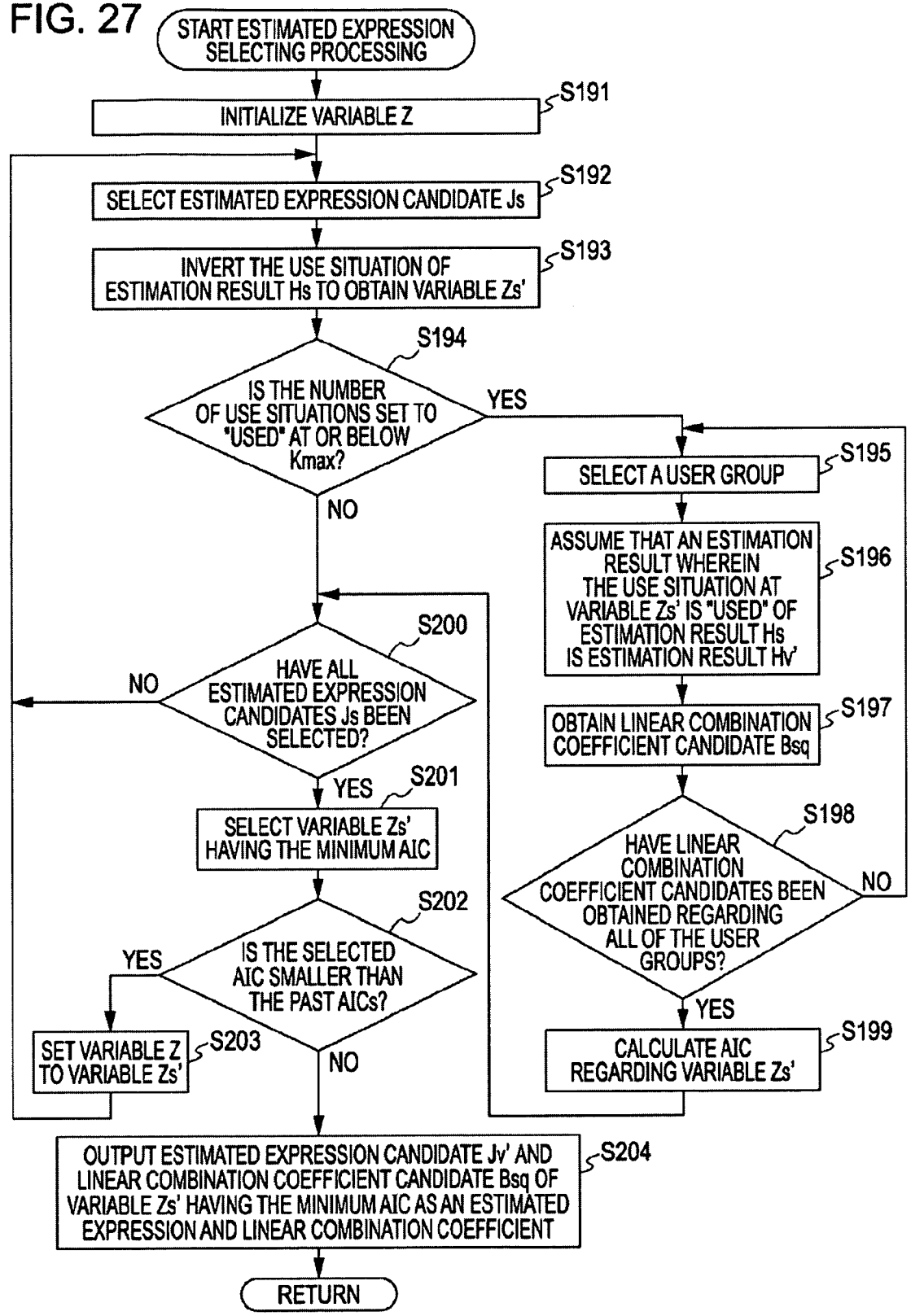

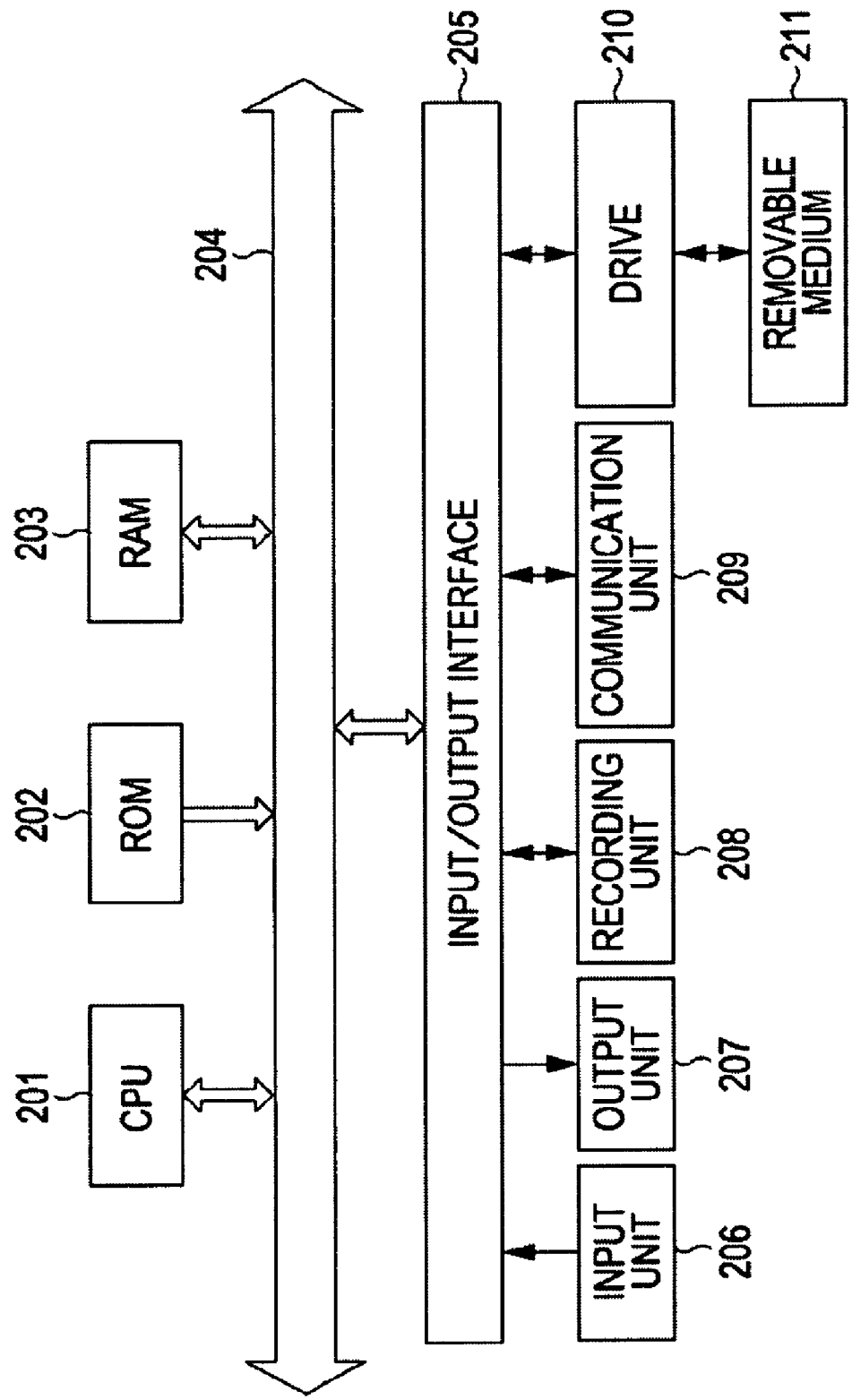

INFORMATION PROCESSING DEVICE, METHOD AND PROGRAM FOR SELECTING EXPRESSION CANDIDATES

BACKGROUND OF THE INVENTION

1. Field of the Invention

The present invention relates to an information processing device and method, and program, and specifically, relates to an information processing device and method, and program, which are employed suitably in the case of recommending a content to a user.

2. Description of the Related Art

Heretofore, there has been a technique according to the related art for estimating the evaluation of a user as to a predetermined content by a collaborative filtering algorithm.

As for an information processing device employing such a collaborative filtering algorithm, there has been an information processing device which performs collaborative filtering processing by employing the viewing and listening history of contents of another user similar to a user of interest to estimate the evaluation as to each content of the user of interest (e.g., see Japanese Unexamined Patent Application Publication No. 2005-167628). With this information processing device, of estimated evaluations of respective contents, a content having the highest evaluation is recommended as a favorite of the user of interest to the user thereof.

SUMMARY OF THE INVENTION

Incidentally, heretofore, the above-mentioned collaborative filtering algorithm has been established by human beings. Therefore, work for improving the estimation precision of an evaluation as to a content is a repetition of trial and error, and accordingly, much labor has been spent for establishment of the collaborative filtering algorithm.

Also, in a case where a modification has to be added to the collaborative filtering algorithm, for example, in a case where a content of a new genre is added as a content employed for estimation of the evaluations of contents, further much labor is spent for modifying the collaborative filtering algorithm.

Thus, much labor and time have been spent for establishment of the collaborative filtering algorithm, and accordingly, improving the estimation precision of an evaluation as to a content of a user has not been easy.

It has been realized that there is demand to enable an algorithm employed for estimation of an evaluation as to a content of a user to be readily established.

According to an embodiment of the present invention, an information processing device which, based on an estimated expression made up of a plurality of operators including an operator for performing computation of collaborative filtering which employs computation employing an evaluation matrix made up of an evaluation value indicating an evaluation for each of a plurality of users as to each of a plurality of evaluation targets to estimate the evaluation value, generates the estimated expression newly employed for estimation of the evaluation value of an unevaluated target included in the evaluation targets which has not been evaluated by the users, includes: an estimated expression candidate generating unit configured to take the estimated expression as an estimated expression candidate which is a candidate of the estimated expression newly employed for estimation of the evaluation value of the unevaluated target, and generate a new estimated expression wherein a portion of the estimated expression is modified, and an arbitrary new estimated expression, as the estimated expression candidates; an estimation result generating unit configured to estimate the evaluation value as to each of the plurality of evaluation targets of each of the users with the evaluation matrix for each of the estimated expression candidates based on the estimated expression candidates and the evaluation matrix to generate an estimation result made up of a predictive evaluation value which is the estimated evaluation value; an evaluating unit configured to calculate the evaluation of the estimated expression candidate based on the estimation result and the evaluation matrix; and a selecting unit configured to select the estimated expression candidate having the highest evaluation calculated by the evaluating unit, of the estimated expression candidates, as the estimated expression newly employed for estimation of the evaluation value of the unevaluated target.

The final estimation result of the evaluation value of the unevaluated target may be obtained by multiplying the predictive evaluation value of the unevaluated target estimated based on the estimated expression and the evaluation matrix by a predetermined coefficient, with the evaluating unit including coefficient calculating unit configured to obtain the coefficient in the case of employing the estimated expression candidate as the estimated expression by employing the estimation result and the evaluation matrix, and information quantity reference calculating unit configured to calculate information quantity reference as an evaluation as to the estimated expression candidate and the coefficient, and with the selecting unit selecting the estimated expression candidate having the highest evaluation based on the information quantity reference, and the coefficient as the estimated expression and the coefficient newly employed for estimation of the evaluation value of the unevaluated target, of the estimated expression candidates and the coefficients.

The final estimation result of the evaluation value of the unevaluated target may be obtained by employing the coefficient to subject each of the predictive evaluation values of the unevaluated target obtained with a plurality of the estimated expressions to linear combination, with the estimated expression candidate generating unit taking the plurality of the estimated expressions as the estimated expression candidates, and generating a new estimated expression in which a part of some of the plurality of estimated expressions are modified, and an arbitrary new estimated expression, as the estimated expression candidates, with the coefficient calculating unit taking some of a plurality of the estimation results as use estimation results, and obtaining the coefficient in the case of employing use estimated expression candidates which are the estimated expression candidates employed for generating the use estimation results as the estimated expressions by employing the use estimation results and the evaluation matrix, and with the selecting unit selecting the use estimated expression candidate having the highest evaluation based on the information quantity reference, and the coefficient as a plurality of the estimated expressions and the coefficient newly employed for estimation of the evaluation value of the unevaluated target, of the use estimated expression candidates and the coefficients.

The coefficient calculating unit may employ, of the plurality of the users belonging to one of a plurality of groups, the evaluation value and the predictive evaluation value of the user belonging to the same group as the group to obtain the coefficient for each of the groups.

According to an embodiment of the present invention, an information processing method or program which, based on an estimated expression made up of a plurality of operators including an operator for performing computation of collaborative filtering which employs computation employing an evaluation matrix made up of an evaluation value indicating an evaluation for each of a plurality of users as to each of a plurality of evaluation targets to estimate the evaluation value, generates the estimated expression newly employed for estimation of the evaluation value of an unevaluated target included in the evaluation targets which has not been evaluated by the users, includes the steps of: taking the estimated expression as an estimated expression candidate which is a candidate of the estimated expression newly employed for estimation of the evaluation value of the unevaluated target, and generating a new estimated expression wherein a portion of the estimated expression is modified, and an arbitrary new estimated expression, as the estimated expression candidates; estimating the evaluation value as to each of the plurality of evaluation targets of each of the users with the evaluation matrix for each of the estimated expression candidates based on the estimated expression candidate and the evaluation matrix to generate an estimation result made up of a predictive evaluation value which is the estimated evaluation value; calculating the evaluation of the estimated expression candidate based on the estimation result and the evaluation matrix; and selecting the estimated expression candidate having the highest evaluation calculated, of the estimated expression candidates, as the estimated expression newly employed for estimation of the evaluation value of the unevaluated target.

With the above-mentioned configuration, with information processing which, based on an estimated expression made up of a plurality of operators including an operator for performing computation of collaborative filtering which employs computation employing an evaluation matrix made up of an evaluation value indicating an evaluation for each of a plurality of users as to each of a plurality of evaluation targets to estimate the evaluation value, generates the estimated expression newly employed for estimation of the evaluation value of an unevaluated target included in the evaluation targets which has not been evaluated by the users, the estimated expression is taken as an estimated expression candidate which is a candidate of the estimated expression newly employed for estimation of the evaluation value of the unevaluated target, and a new estimated expression wherein a portion of the estimated expression is modified, and an arbitrary new estimated expression are generated as the estimated expression candidates, the evaluation value as to each of the plurality of evaluation targets of each of the users with the evaluation matrix for each of the estimated expression candidates is estimated based on the estimated expression candidate and the evaluation matrix to generate an estimation result made up of a predictive evaluation value which is the estimated evaluation value, the evaluation of the estimated expression candidate is calculated based on the estimation result and the evaluation matrix, and the estimated expression candidate having the highest evaluation calculated is, of the estimated expression candidates, selected as the estimated expression newly employed for estimation of the evaluation value of the unevaluated target.

According to an embodiment of the present invention, an algorithm employed for estimation of an evaluation as to a content of a user can be more readily established.

BRIEF DESCRIPTION OF THE DRAWINGS

FIG. 1 is a diagram describing the overview of a content recommendation system to which an embodiment of the present invention has been applied;

FIG. 2 is a diagram describing the overview of the content recommendation system to which the embodiment of the present invention has been applied;

FIG. 8 is a diagram illustrating examples of operators;

FIGS. 9A through 9C are diagrams illustrating examples of estimated expressions;

FIG. 13 is a diagram describing a specific example of computation of operators;

FIG. 14 is a diagram describing a specific example of computation of operators;

FIG. 15 is a diagram describing a specific example of computation of operators;

FIG. 21 is a flowchart describing estimation candidate generating processing;

FIGS. 22A through 22F are diagrams describing examples of mutation processing;

FIG. 25 is a diagram describing computation of an estimated expression candidate;

FIG. 27 is a flowchart describing estimated expression selecting processing; and FIG. 28 is a block diagram illustrating a configuration example of a computer.

DESCRIPTION OF THE PREFERRED EMBODIMENTS

Figure 3:
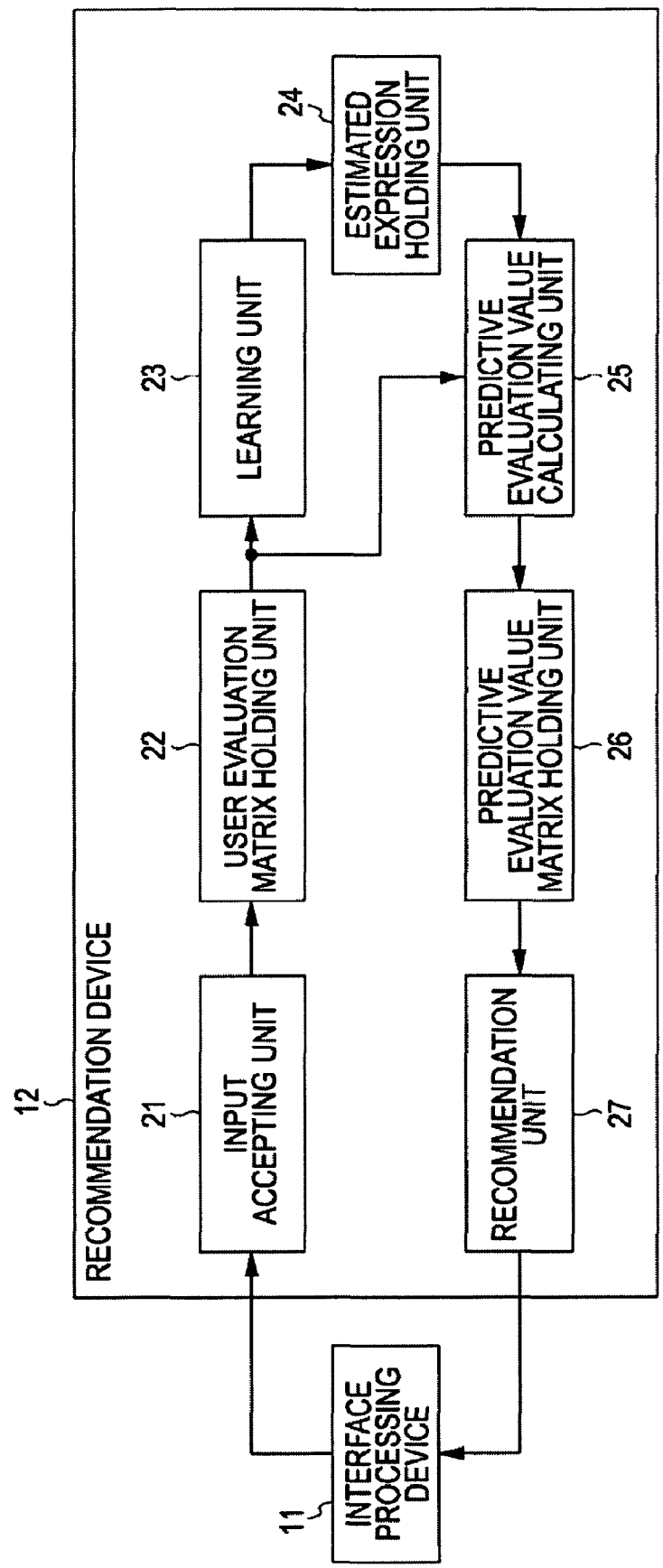
FIG. 3 is a block diagram illustrating a configuration example of the content recommendation system.

An embodiment to which the present invention has been applied will be described below with reference to the drawings. First, an overview of a content recommendation system to which an embodiment of the present invention has been applied will be described with reference to FIGS. 1 and 2.

With this content recommendation system, for example, as shown in FIG. 1, multiple users and contents are registered beforehand. Note that, in FIG. 1, C1 through CM in the horizontal direction indicate contents, and U1 through UN in the vertical direction indicate users. That is to say, with the content recommendation system, M contents C1 through CM, and N users U1 through UN are registered beforehand. Each user inputs to some of the registered contents an evaluation value indicating the evaluation of the contents thereof.

For example, let us say that the evaluation of a content is classified into five stages of abhorrent, dislikable, neither dislikable nor likable, likable, and favorite, and a numeric value from 1 to 5 indicating each evaluation is input as an evaluation value. Here, let us say that the greater an evaluation value is, the higher an evaluation as to a content of a user is.

For example, in FIG. 1, the user U4 has performed evaluations as to the contents C1 and C5, and "5" is input as the evaluation value of the content C5. That is to say, it can be found that the evaluation of the user U4 as to the content C5 is high. Note that a content serving as a user's evaluation target may be any kind of target, for example, such as a moving image or book or the like, as long as the target is an evaluation target evaluated based on a user's preference.

Thus, upon an evaluation value as to a content being input by each user, information indicating an evaluation value as to a content for each user is obtained. The thus obtained information indicating an evaluation value as to a content of each user is held at the content recommendation system as a user evaluation matrix.

Upon obtaining the user evaluation matrix, the content recommendation system predicts (estimates) the evaluation value of a content which has not been input yet based on the previously-input evaluation values with the user evaluation matrix, and generates a predictive evaluation matrix made up of a predictive evaluation value obtained by prediction, and a previously-input evaluation value.

Here, the previously-input evaluation value means an evaluation value input by a user. For example, in FIG. 1, "1" has been input as an evaluation value as to the content C1 of the user U1, and this evaluation value "1" is taken as a previously-input evaluation value. Also, with the following description, an evaluation value which has not been input by a user, i.e., the value of a blank column in FIG. 1 will be referred to as a non-input evaluation value. For example, the evaluation value as to the content C1 of the user U2 has not been input actually, so does not exist, but an evaluation value which has not been input as to the content C1 of the user U2 will be referred to as a non-input evaluation value.

Thus, the content recommendation system predicts a non-input evaluation value within the user evaluation matrix, and upon obtaining a predictive evaluation value which is the prediction result thereof, thereby obtaining a prediction evaluation matrix made up of the predictive evaluation value and previously-input evaluation value. Thus, for example, the predictive evaluation matrix shown in FIG. 2 is obtained from the user evaluation matrix in FIG. 1. Note that, in FIG. 2, the evaluation value within a shaded column represents a predictive evaluation value. For example, with the predictive evaluation matrix in FIG. 2, the evaluation value as to the content C1 of the user U2 is set to a predictive evaluation value "2" obtained by prediction.

Upon obtaining a predictive evaluation value regarding the value of each blank column with the user evaluation matrix, i.e., non-input evaluation value, and obtaining a predictive evaluation matrix, the content recommendation system provides a predetermined user information indicating a content estimated as the user's favorite to recommend this content.

For example, in the case of recommending a content to the user U2, the content recommendation system recommends a content having the greatest predictive evaluation value of the registered contents to the user U2. That is to say, of the contents C1 through CM, the content C5 of which the predictive evaluation value of the user U2 is the maximum value "5" is estimated as the user's favorite content, and is recommended to the user U2.

Thus, the recommendation system for obtaining a predictive evaluation matrix from the user evaluation matrix to recommend a content to a user is configured, for example, such as shown in FIG. 3. In FIG. 3, the content recommendation system is configured of an interface processing device 11, and recommendation device 12, and the interface processing device 11 and recommendation device 12 are mutually connected.

The interface processing device 11 is operated by the user, and performs interface processing as to the user. For example, the interface processing device 11 supplies the evaluation value input by the user to the recommendation device 12, or displays information indicating a content recommended to the user, supplied from the recommendation device 12.

The recommendation device 12 generates a user evaluation matrix based on the evaluation value supplied from the interface processing device 11, and generates a predictive evaluation matrix based on the user evaluation matrix, and recommends a content to the user. The recommendation device 12 includes an input accepting unit 21, user evaluation matrix holding unit 22, learning unit 23, estimated expression holding unit 24, predictive evaluation value calculating unit 25, predictive evaluation matrix holding unit 26, and recommendation unit 27.

The input accepting unit 21 accepts input of an evaluation value of the user. That is to say, the input accepting unit 21 supplies the evaluation value supplied from the interface processing device 11 to the user evaluation matrix holding unit 22. The user evaluation matrix holding unit 22 generates a user evaluation matrix based on the evaluation value supplied from the input accepting unit 21, and holds this. More specifically, each time the evaluation value is supplied from the input accepting unit 21, the user evaluation matrix holding unit 22 employs the supplied evaluation value to update the held user evaluation matrix. Also, the user evaluation matrix holding unit 22 supplies the held user evaluation matrix to the learning unit 23 and predictive evaluation value calculating unit 25.

The learning unit 23 employs the user evaluation matrix supplied from the user evaluation matrix holding unit 22 to generate an estimated expression and linear combination coefficient employed when generating a predictive evaluation matrix from the user evaluation matrix, and supplies these to the estimated expression holding unit 24. With the learning unit 23, one or multiple estimated expressions and a linear combination coefficient for each user are generated. The estimated expression holding unit 24 holds the estimated expression and linear combination coefficient supplied from the learning unit 23, and supplies the held estimated expression and linear combination coefficient to the predictive evaluation value calculating unit 25.

The predictive evaluation value calculating unit 25 employs the user evaluation matrix from the user evaluation matrix holding unit 22, and the estimated expression and linear combination coefficient from the estimated expression holding unit 24 to calculate a predictive evaluation value as to a non-input evaluation value with the user evaluation matrix, and supplies this to the predictive evaluation matrix holding unit 26.

The predictive evaluation matrix holding unit 26 generates a predictive evaluation matrix based on the predictive evaluation value from the predictive evaluation value calculating unit 25, holds this, and supplies the held predictive evaluation matrix to the recommendation unit 27. The recommendation unit 27 searches a content to recommend to a predetermined user based on the predictive evaluation matrix supplied from the predictive evaluation matrix holding unit 26, and supplies recommendation information indicating the content obtained as a result thereof to the interface processing device 11.

Figure 4:
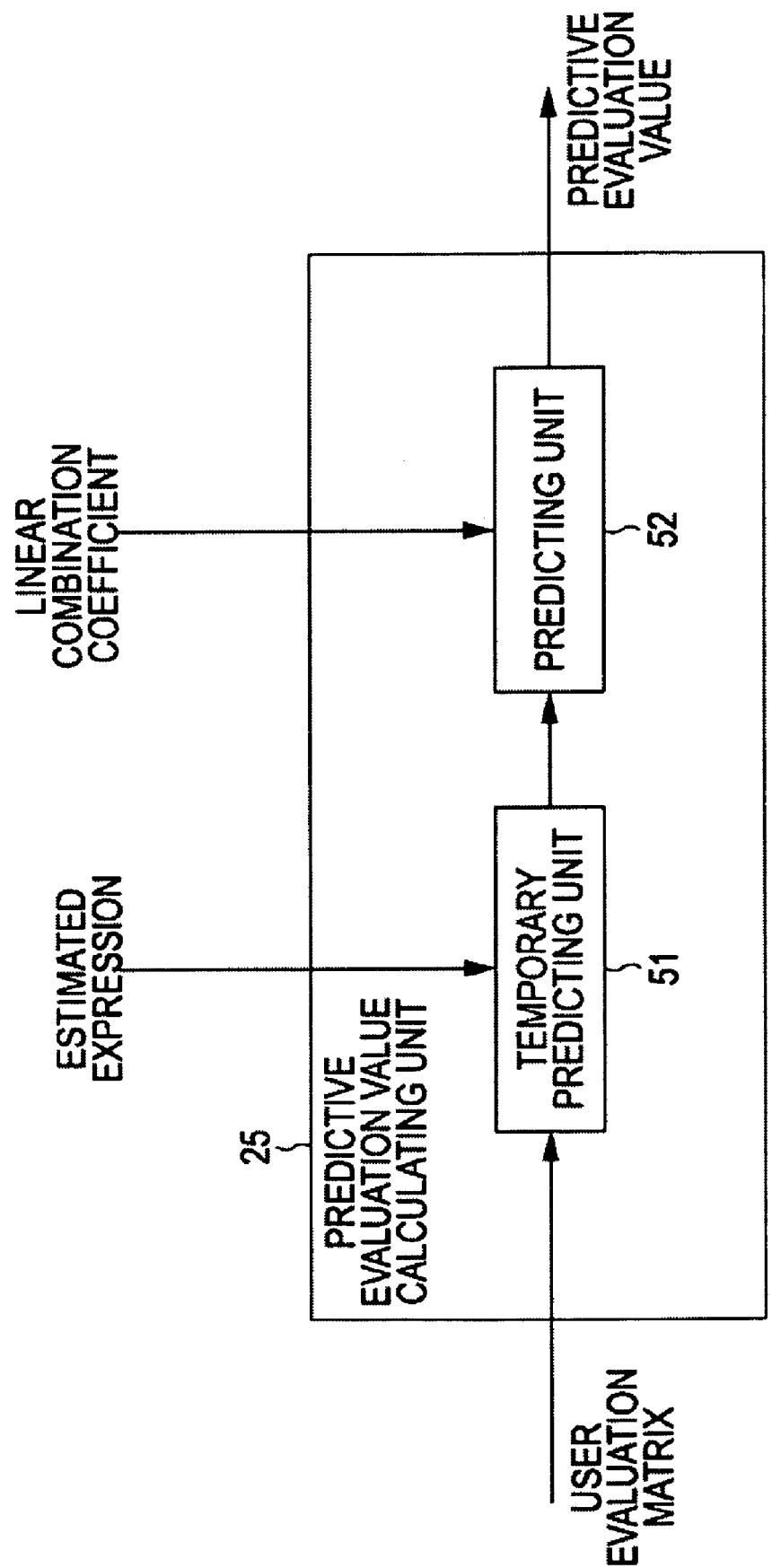
FIG. 4 is a block diagram illustrating a more detailed configuration example of a predictive evaluation value calculating unit.

FIG. 4 is a block diagram illustrating a detailed configuration example of the predictive evaluation value calculating unit 25 in FIG. 3. The predictive evaluation value calculating unit 25 includes a temporary predicting unit 51 and predicting unit 52, and the user evaluation matrix and estimated expression are supplied to the temporary predicting unit 51 from the user evaluation matrix holding unit 22 and estimated expression holding unit 24, and the linear combination coefficient is supplied to the predicting unit 52 from the estimated expression holding unit 24.

Here, the estimated expression is an arithmetic expression for performing computation for obtaining a predictive evaluation value of a non-input evaluation value, for example, by the collaborative filtering algorithm. In other words, an arithmetic expression for obtaining a predictive evaluation value by a predetermined estimating method employing the collaborative filtering algorithm is taken as an estimated expression. Also, a linear combination coefficient for each user corresponding to an estimated expression is a coefficient employed when prediction results according to multiple estimated expressions are subjected to linear combination.

The temporary predicting unit 51 employs the supplied user evaluation matrix and estimated expression to calculate a temporary predictive evaluation value of a non-input evaluation value with the user evaluation matrix, and supplies this to the predicting unit 52. More specifically, the temporary predicting unit 51 takes the same matrix (information) as the user evaluation matrix as a temporary predictive matrix, and employs the estimated expression to perform computation as to the temporary predictive matrix. Subsequently, the temporary predicting unit 51 takes information made up of an evaluation value as to each content of one user of the temporary predictive matrix as a temporary user predictive matrix.

Accordingly, the temporary user predictive matrix is made up of a previously-input evaluation value as to a content of one user, and temporary predictive evaluation value, and the temporary predictive matrix is made up of the temporary user predictive matrix of each user.

For example, if we say that the user evaluation matrix in FIG. 1 is supplied, the temporary predicting unit 51 employs one estimated expression Fk to obtain a temporary predictive evaluation value of the user U1 regarding a non-input evaluation value of the user U1, i.e., regarding the content C3 and contents C5 through CM. Subsequently, the temporary predicting unit 51 supplies information made up of the previously-input evaluation values of the contents C1, C2, and C4, and the temporary predictive evaluation values of the contents C3 and C5 through CM to the predicting unit 52 as the temporary user predictive matrix of the user U1 as to the estimated expression Fk.

Accordingly, for example, in a case where K estimated expressions F1 through FK are supplied to the temporary predicting unit 51, a temporary user predictive matrix Tnk (wherein $1 \leq k \leq K$, $1 \leq n \leq N$) for each estimated expression Fk (wherein $1 \leq k \leq K$) obtained regarding each of the users U1 through UN is supplied from the temporary predicting unit 51 to the predicting unit 52. That is to say, a total of the N×K temporary user predictive matrixes Tnk are supplied to the predicting unit 52.

The predicting unit 52 employs the temporary predictive evaluation value from the temporary predicting unit 51, and the linear combination coefficient supplied from the estimated expression holding unit 24 to obtain the final predictive evaluation value, and supplies this to the predictive evaluation matrix holding unit 26. More specifically, the predicting unit 52 subjects the temporary user predictive matrix for each user to linear combination by employing the linear combination coefficient for each user, and supplies the user predictive matrix obtained as a result thereof to the predictive evaluation matrix holding unit 26.

For example, K temporary user predictive matrixes Tn1 through Tnk obtained regarding the user Un (wherein $1 \leq n \leq N$) are subjected to linear combination by the linear combination coefficient of the user Un, thereby providing a user predictive matrix An of the user Un. Subsequently, a total of the N user predictive matrixes A1 through AN obtained regarding N users are supplied to the predictive evaluation matrix holding unit 26, and a predictive evaluation matrix made up of these user predictive matrixes is generated.

Figure 5:
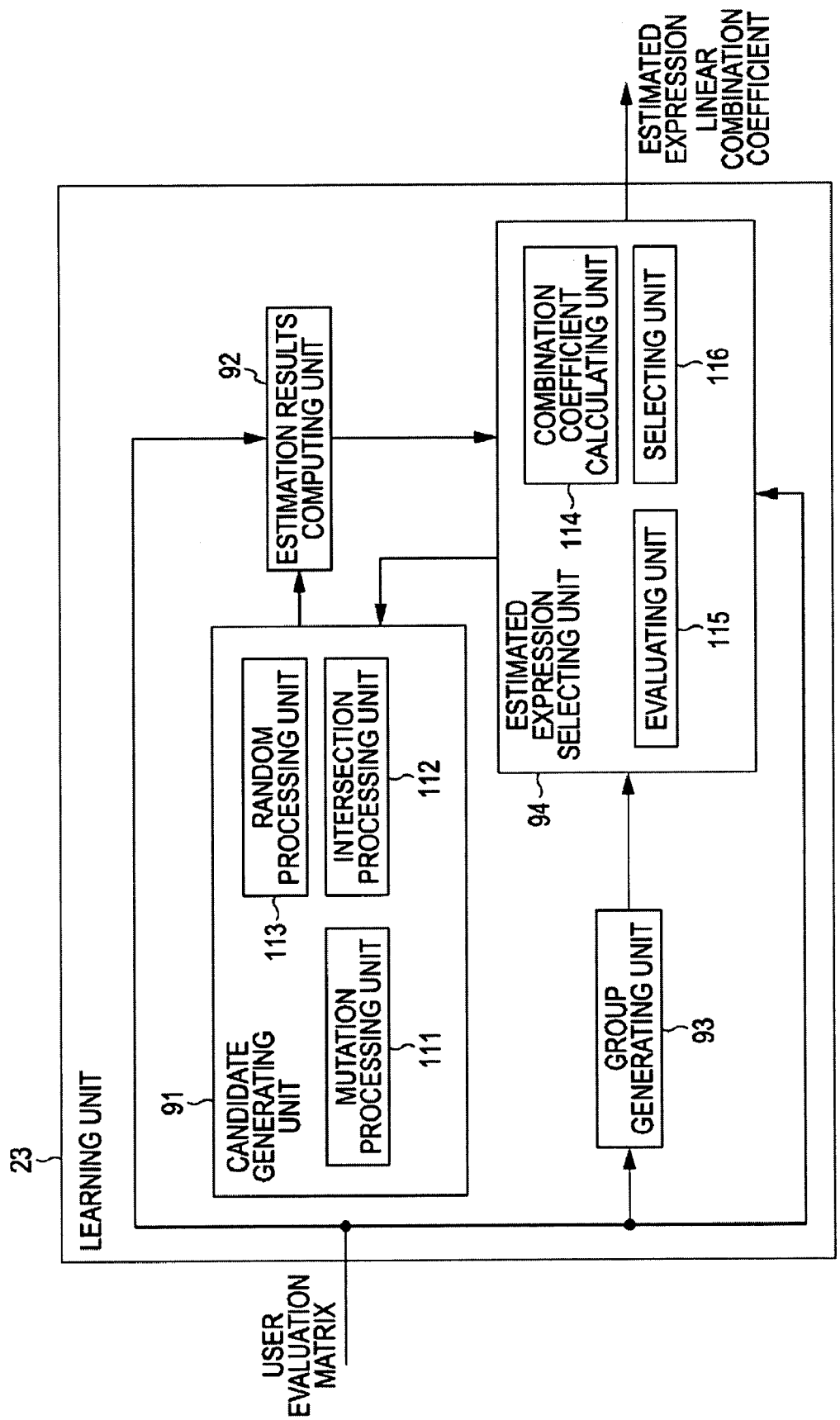
FIG. 5 is a block diagram illustrating a more detailed configuration example of a learning unit.

Next, FIG. 5 is a block diagram illustrating a more detailed configuration example of the learning unit 23 in FIG. 3. The learning unit 23 generates an estimated expression and linear combination coefficient more suitable for generating a predictive evaluation matrix by the genetic programming. In other words, the learning unit 23 optimizes an estimated expression and a linear combination coefficient employing the collaborative filtering algorithm by the genetic programming, thereby establishing a recommendation algorithm for recommending a content estimated as a user's favorite to the user in a laborsaving manner.

The learning unit 23 is configured of a candidate generating unit 91, estimation results computing unit 92, group generating unit 93, and estimated expression selecting unit 94, and the user evaluation matrix from the user evaluation matrix holding unit 22 is supplied to the estimation results computing unit 92 through estimated expression selecting unit 94.

The candidate generating unit 91 employs the K estimated expressions F1 through FK supplied from the estimated expression selecting unit 94 to generate estimated expression candidates J1 through JS (wherein $K \leq S$) which are new estimated expression candidates, and supplies these to the estimation results computing unit 92. That is to say, the candidate generating unit 91 generates S estimated expression candidates which are the estimated expression candidates of the next generation from the estimated expression of the previous generation employing the genetic programming. The candidate generating unit 91 includes a mutation processing unit 111, intersection processing unit 112, and random processing unit 113.

The mutation processing unit 111 performs mutation processing by employing the estimated expression supplied from the estimated expression selecting unit 94, thereby generating an estimated expression candidate. Here, the mutation processing means processing for generating one new estimated expression by modifying a portion of one estimated expression.

The intersection processing unit 112 employs the estimated expression supplied from the estimated expression selecting unit 94 to perform intersection processing, thereby generating an estimated expression candidate. Here, the intersection processing means processing for generating one new estimated expression by changing a portion of one estimated expression to a portion of another estimated expression. That is to say, with the intersection processing, a portion of one estimated expression is replaced with a portion of another estimated expression.

The random processing unit 113 performs random processing, thereby generating an estimated expression candidate. Here, the random processing means processing for generating one new estimated expression by combining operators selected randomly. That is to say, according to the random processing, an arbitrary new estimated expression candidate is generated without employing the estimated expression of the previous generation at all.

The candidate generating unit 91 supplies a total of S estimated expressions of the previous generation supplied from the estimated expression selecting unit 94, and the new estimated expressions generated by the mutation processing, intersection processing, and random processing to the estimation results computing unit 92 as estimated expression candidates.

The estimation results computing unit 92 employs the user evaluation matrix supplied from the user evaluation matrix holding unit 22, and the estimated expression candidate supplied from the candidate generating unit 91 to perform estimation of an evaluation value with the user evaluation matrix for each estimated expression candidate Js (wherein $1 \leq s \leq S$), and supplies an estimation result Hs thereof (wherein $1 \leq s \leq S$) to the estimated expression selecting unit 94.

That is to say, the estimation results computing unit 92 takes the same matrix (information) as the user evaluation matrix as an estimation result (of the matrix) as to one estimated expression candidate, and employs the estimated expression candidate thereof to estimate an evaluation value as to each content of each user with the estimation result (user evaluation matrix). Subsequently, the estimation results computing unit 92 takes the estimation result wherein each evaluation value is obtained by estimation as the final estimation result as to the employed estimated expression candidate. Accordingly, estimation results are supplied from the estimation results computing unit 92 to the estimated expression selecting unit 94 by the number of estimated expression candidates.

The group generating unit 93 employs the user evaluation matrix supplied from the user evaluation matrix holding unit 22 to perform grouping regarding the users U1 through UN registered beforehand, and supplies group information indicating each user group, and the users belonging to the user group thereof to the estimated expression selecting unit 94.

For example, a user profile which is information indicating the age, sex, address, favorite genre, and so forth of each user is supplied to the group generating unit 93 as appropriate. The group generating unit 93 employs the supplied user profile as appropriate to perform grouping such that each of the users U1 through UN belongs to one user group of predetermined user groups G1 through GQ.

The estimated expression selecting unit 94 employs the user evaluation matrix from the user evaluation matrix holding unit 22, the estimation result Hs from the estimation results computing unit 92, and the user group information from the group generating unit 93 to generate the estimated expression and linear combination coefficient of the next generation, and supplies these to the candidate generating unit 91 and estimated expression holding unit 24.

The estimated expression selecting unit 94 includes a combination coefficient calculating unit 114, evaluating unit 115, and selecting unit 116.

The combination coefficient calculating unit 114 assumes that some of the S estimation results are selected, and each combination of the estimated expression candidates employed for obtaining each of the selected estimation results is employed as an estimated expression. Subsequently, the combination coefficient calculating unit 114 employs the supplied user evaluation matrix, estimation results, and user group information to obtain the linear combination coefficient for each user group in a case where a combination of estimated expression candidates is taken as an estimated expression, as a linear combination coefficient which is a linear combination coefficient candidate.

The evaluating unit 115 obtains evaluations as to the estimated expression candidates and linear combination coefficient candidates regarding the combination of estimated expression candidates, and linear combination coefficient candidates obtained by the combination coefficient calculating unit 114. That is to say, the more these estimated expression candidates and linear combination coefficient candidates are suitable for generation of a predictive evaluation matrix, the higher the evaluation thereof is. For example, information quantity reference is calculated as evaluation indexes as to the estimated expression candidates and linear combination coefficient candidates.

The selecting unit 116 selects, of the combination of estimated expression candidates and linear combination coefficient candidates, a combination of estimated expression candidates and linear combination coefficient candidate having the highest evaluation, and employs these as the estimated expression and linear combination coefficient of the next generation.

The estimated expression selecting unit 94 supplies the estimated expression and linear combination coefficient of the next generation selected by the selecting unit 116 to the candidate generating unit 91 and estimated expression holding unit 24. Here, the number K of estimated expressions of the next generation does not necessarily become a certain fixed number, and accordingly, fluctuates from 1 to the upper limit Kmax for each generation.

Incidentally, upon a user Un (wherein $1 \leq n \leq N$) registered in the content recommendation system beforehand operating the interface processing device 11 to input an evaluation value as to a predetermined content Cm (wherein $1 \leq m \leq M$), the input evaluation value is supplied from the interface processing device 11 to the input accepting unit 21. Then, user evaluation matrix updating processing for updating the user evaluation matrix is started by the recommendation device 12. Description will be made below regarding the user evaluation matrix updating processing by the recommendation device 12, with reference to the flowchart in FIG. 6.

In step S11, the input accepting unit 21 obtains an evaluation value input by the user. Subsequently, the input accepting unit 21 supplies the obtained evaluation value to the user evaluation matrix holding unit 22.

In step S12, the user evaluation matrix holding unit 22 updates the held user evaluation matrix based on the evaluation value supplied from the input accepting unit 21, and the user evaluation matrix updating processing ends. For example, in a case where the user evaluation matrix holding unit 22 holds the user evaluation matrix shown in FIG. 1, and an evaluation value as to the content C3 of the user U1 is supplied from the input accepting unit 21, the user evaluation matrix holding unit 22 writes the supplied evaluation value in the column determined with the user U1 and content C3 with the held user evaluation matrix to update the user evaluation matrix.

Thus, the recommendation device 12 updates the held user evaluation matrix. Thus, the user evaluation matrix is updated each time an evaluation value is input by the user, whereby a more reliable predictive evaluation matrix can be obtained.

With the predictive evaluation value calculating unit 25, calculation of a predictive evaluation value is performed by employing the user evaluation matrix thus updated as appropriate, and the estimated expression and linear combination coefficient from the estimated expression holding unit 24.

Figures 6, 7:
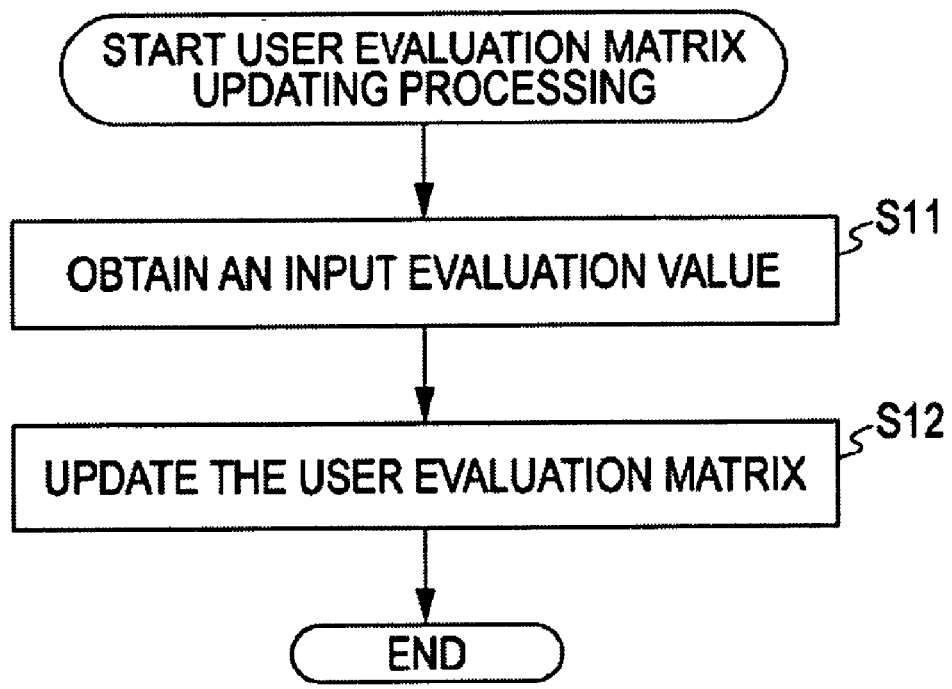
FIG. 6 is a flowchart describing updating processing of a user evaluation matrix.
FIG. 7 is a diagram illustrating an example of an estimated expression.

Incidentally, the estimated expression employed for calculation of a predictive evaluation value is, for example, as shown in FIG. 7, configured of operators for performing a calculation by the basic algorithm, i.e., a combination of operators, which are employed for estimation of an evaluation as to a user's content. Also, at least one operator for performing a calculation of the collaborative filtering, i.e., a calculation in accordance with the collaborative filtering algorithm is included in an estimated expression.

Each of portions W11 through W14 of the estimated expression shown in FIG. 7 includes one operator, and the estimated expression is configured of a combination of these operators. For example, the portion W11 includes a processing axis parameter "U#", and operator "Normalize Avg".

Here, the processing axis parameter means information for determining an evaluation value to be processed, of the evaluation values (at least any one evaluation value of a previously-input evaluation value and non-input evaluation value) of the user evaluation matrix (temporary predictive matrix). That is to say, the processing axis parameter "U#" indicates that the evaluation values of the same user are taken as processing targets. For example, the evaluation values as to the contents C1 through CM of the user U1 become processing targets. Also, the operator "Normalize Avg" indicates that the evaluation values in the user evaluation matrix are normalized with the mean value of the evaluation values.

The portion W12 of the estimated expression includes a processing axis parameter "C#" indicating that the evaluation values of the same content are taken as processing targets, and an operator "FillAvg" indicating that the blank columns of the user evaluation matrix (temporary predictive matrix), i.e., the columns of non-input evaluation values are filled with the mean value of the evaluation values.

Also, the portion W13 of the estimated expression includes a processing axis parameter "U;C#" indicating that after the evaluation values of the same user are taken as processing targets, further the evaluation values as to the same content are taken as processing targets, and an operator "CF-Pearson (8)" for calculating a predictive evaluation value from the evaluation values of eight users in the descending order of the Pearson correlation. The calculation employing the Pearson correlation which is executed by this operator is a typical example of the collaborative filtering algorithm.

Note that the numeral "8" in the operator "CF-Pearson(8)" indicates a parameter indicating the value of a variable in arithmetic processing by the operator. That is to say, here, the parameter "8" indicates that the evaluation values of eight users are employed.

Further, the portion W14 of the estimated expression includes an operator "Sqrt" indicating that the square root of each evaluation value is obtained.

Thus, with the estimated expression made up of multiple operators, a calculation is performed in the order from the left-sided operator to the right-edge operator in the drawing. That is to say, according to the estimated expression shown in FIG. 7, first, the previously-input evaluation value of the user evaluation matrix (temporary predictive matrix) is normalized for each user, and the mean value of the evaluation value for each content is taken as the non-input evaluation value of the content thereof. Subsequently, the Pearson correlation between users is obtained, and for each user, from the evaluation values of the user thereof, and eight users having the high Pearson correlation, the non-input evaluation value of the user thereof is obtained, and finally, the square root of each evaluation value is obtained, and the obtained value is taken as the final previously-input evaluation value or predictive evaluation value.

Thus, the previously-input evaluation value in the user evaluation matrix (temporary predictive matrix) is processed depending on the operator included in the estimated expression by the arithmetic processing of the operator thereof in some cases.

Also, as for operators included in an estimated expression, for example, the operators shown in FIG. 8 can be conceived. In FIG. 8, operators are shown in the operator name column on the left side, and the processing content of the calculation indicated with the operator of the left-sided column is shown in the processing content column on the right side.

Specifically, an operator "NormalizeMaxMin" is an operator for normalizing an evaluation value with the maximum value and minimum value, and an operator "NormalizeAvg" is an operator for normalizing an evaluation value by the mean value of evaluation values.

Also, an operator "FillMax" is an operator for filling the blank columns of the user evaluation matrix with the maximum value of evaluation values, and an operator "FillMin" is an operator for filling the blank columns of the user evaluation matrix with the minimum value of evaluation values. Further, an operator "FillMedian" is an operator for filling the blank columns of the user evaluation matrix with the median value of evaluation values, and an operator "FillAvg" is an operator for filling the blank columns of the user evaluation matrix with the mean value of evaluation values.

Further, an operator "CF-Correl(num)" is an operator taking the mean value of num evaluation values from the highest correlation according to a cosine distance as a predictive evaluation value, and an operator "CF-Pearson(num)" is an operator taking the mean value of num evaluation values from the highest Pearson correlation as a predictive evaluation value. Further, also, an operator "CF-Euclid(num)" is an operator taking the mean value of num evaluation values from the nearest Euclidian distance as a predictive evaluation value. Here, the "num" in the operators "CF-Correl(num)", "CF-Pearson(num)", and "CF-Euiclidian(num)" represents a parameter.

Also, there are operators for performing computation relating to an exponential function such as an operator "log" for computing a logarithm, operator "Exp" for computing an exponential function, operator "Sqrt" for computing a square root, and so forth. Further, there are also operators for performing computation of a trigonometric function such as an operator "Sin" for computing a sine function, operator "Cos" for computing a cosine function, operator "Tan" for computing a tangent function, and so forth.

Let us say that, with the computation of an operator for filling the blank columns of the user evaluation matrix (temporary predictive matrix Tk or estimation result Hs), i.e., the computation of an operator for obtaining the predictive evaluation value of a non-input evaluation value, the evaluation value of a column to be calculated is not employed for computation for obtaining the predictive evaluation value of the column thereof.

As another example of an estimated expression which can be obtained by combining such operators, for example, there are the estimated expressions shown in FIGS. 9A through 9C.

With the estimated expression shown in FIG. 9A, first, after the evaluation values of the user evaluation matrix (temporary predictive matrix) are normalized to a value from 0 to 1 for each user, each evaluation value is subjected to computation of a sine function, thereby obtaining a cosine distance between users. Subsequently, of users who evaluate the content Cm, the evaluation value as to the content Cm of one user having the highest correlation according to the cosine distance as to a user to be processed is taken as the predictive evaluation value as to the content Cm of the user to be processed thereof.

Also, with the estimated expression shown in FIG. 9B, of the contents which a user has evaluated, three contents having the highest correlation according to an Euclidian distance as to a content to be processed are selected, and the mean value of the evaluation values of the user as to the selected contents is taken as the predictive evaluation value of the content to be processed.

Further, with the estimated expression shown in FIG. 9C, each evaluation value of the user evaluation matrix (temporary predictive matrix) is subjected to computation of a logarithmic function, for each content the mean value of the evaluation values of each user as to the content is obtained, and the obtained mean value is taken as the predictive evaluation value of the content thereof.

The recommendation device 12 employs the above-mentioned estimated expression and linear combination coefficient to obtain the predictive evaluation value of a non-input evaluation value in the user evaluation matrix, whereby the recommendation device 12 can recommend a content to each user.

For example, the recommendation device 12 performs recommendation processing periodically or in accordance with the instructions from the interface processing device 11 to generate recommendation information indicating a content to be recommended to a user. The recommendation processing by the recommendation device 12 will be described below with reference to the flowchart in FIG. 10.

In step S41, the predictive evaluation value calculating unit 25 sets an estimated expression parameter k for determining the estimated expression Fk (wherein $1 \leq k \leq K$) supplied from the estimated expression holding unit 24 to 1. That is to say, when setting the estimated parameter k to 1, the estimated expression F1 is determined by the estimated expression parameter k=1, and the estimated expression F1 is employed for the processing.

In step S42, the temporary predicting unit 51 substitutes the evaluation values of the user evaluation matrix supplied from the user evaluation matrix holding unit 22 for a temporary predictive matrix Fk indicating the evaluation values as to the contents of the users U1 through UN. That is to say, the same information (matrix) as the user evaluation matrix is taken as the temporary predictive matrix Tk (wherein $1 \leq k \leq K$) as to the estimated expression Fk. For example, in a case where the estimated expression parameter k=1, the same information as the user evaluation matrix is taken as the temporary predictive matrix T1 as to the estimated expression F1.

In step S43, the temporary predicting unit 51 selects one operator making up the estimated expression Fk selected as the estimated expression employed for the processing. For example, in a case where the estimated expression shown in FIG. 7 is supplied as the estimated expression Fk, in FIG. 7 the operators are sequentially selected from the left-sided operator to the right-sided operator. Accordingly, for example, with the estimated expression in FIG. 7, the operator "NormalizeAvg" is first selected.

In step S44, the temporary predicting unit 51 subjects the temporary predictive matrix Tk to the arithmetic processing indicated with the selected operator.

In step S45, the temporary predicting unit 51 determines whether or not the arithmetic processing by all of the operators making up the estimated expression Fk has been performed regarding the estimated expression Fk employed for the processing, i.e., the estimated expression Fk determined with the estimated expression parameter k.

In a case where determination is made in step S45 that the arithmetic processing by all of the operators has not been performed, i.e., in a case where all of the operators have not been selected, the processing returns to step S43, and the above-mentioned processing is repeated. Specifically, the next operator making up the estimated expression Fk is selected, and the arithmetic processing by the operator thereof is performed.

On the other hand, in a case where determination is made in step S45 that the arithmetic processing by all of the operators has been performed, the computation as to the temporary predictive matrix Tk has been performed by employing the estimated expression Fk employed for the processing, whereby the temporary predicting unit 51 supplies the temporary predictive matrix Tk subjected to the arithmetic processing by employing the estimated expression Fk to the predicting unit 52. Subsequently, the processing proceeds to step S46.

Specifically, for example, if we say that the estimated expression Fk in FIG. 7 has been selected, this means that the four operators included in the estimated expression Fk have been selected sequentially to perform computation as to the temporary predictive matrix Tk.

Figure 11:
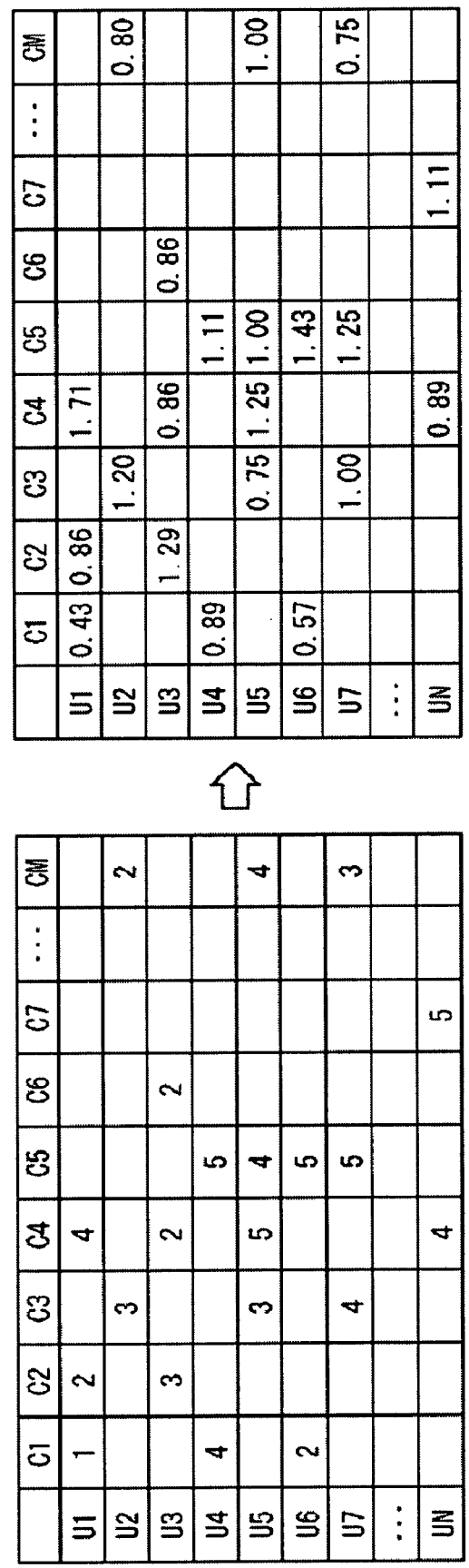
FIG. 11 is a diagram describing a specific example of computation of operators.

More specifically, if we say that the user evaluation matrix in FIG. 1 has been supplied, and the estimated expression Fk shown in FIG. 7 has been selected, as shown in the left side in FIG. 11, the same information as the user evaluation matrix in FIG. 1 is taken as the temporary predictive matrix Tk. Subsequently, the temporary predictive matrix Tk is subjected to computation by the operator included in the portion W11 in FIG. 7, the evaluation values are normalized for each user such that, with regard to each user, the mean value of the evaluation value as to each content of the user becomes 1. Thus, the temporary predictive matrix Tk shown in the right side of FIG. 11 is obtained.

For example, when paying attention to the user U1 in the temporary predictive matrix Tk before normalization, evaluation values "1", "2", and "4" are input to the contents C1, C2, and C4 by the user U1, respectively. Then, the temporary predicting unit 51 normalizes the evaluation values of the contents C1, C2, and C4 such that the mean value of the evaluation values as to these contents becomes 1.

Thus, for example, as shown in the right side in FIG. 11, an evaluation value "0.43" ($0.43 \cong 1 \times 3/(1+2+4)$) is obtained as the evaluation value as to the content C1 of the user U1 after computation by the operator.

Figure 12:
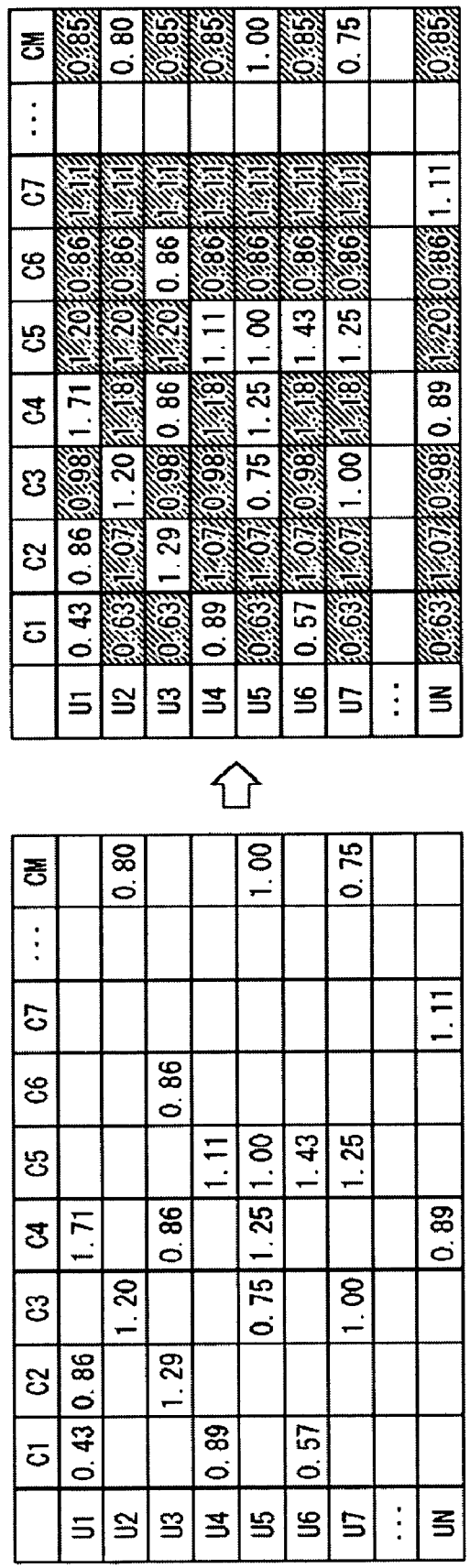
FIG. 12 is a diagram describing a specific example of computation of operators.

Thus, upon computation of the operator included in the portion W11 of the estimated expression Fk in FIG. 7, being performed, next, the operator included in the portion W12 is selected, and as shown in FIG. 12, the temporary predictive matrix Tk is subjected to computation by the operator thereof.

That is to say, the blank columns in the temporary predictive matrix Tk of which the evaluations have been normalized, shown in the left side in FIG. 12, are filled with the mean value of the evaluation values of the respective contents, thereby obtaining the temporary predictive matrix Tk shown in the right side in the drawing. For example, taking note of the content C1 in the normalized temporary predictive matrix Tk, evaluation has been performed by the users U1, U4, and U6, and the evaluation values thereof are "0.43", "0.89", and "0.57".

Therefore, the temporary predicting unit 51 obtains the mean value of these evaluation values, and sets the predictive evaluation value of a non-input evaluation value of the evaluation values as to the content C1 of the temporary predictive matrix Tk to the obtained mean value "0.63" ($0.63 \cong (0.43 + 0.89 + 0.57) \geq 3$). Thus, as shown in the right side in the drawing, the evaluation columns as to the content C1 of all of the other users except for the users U1, U4, and U6 are filled with a predictive evaluation value "0.63". Note that, with the temporary predictive matrix Tk shown in the right side in FIG. 12, the shaded columns indicate the columns filled with the predictive evaluation value as to a non-input evaluation value.

Upon the computation of the portion W12 being performed, further the operator included in the portion W13 is selected, and the temporary predictive matrix Tk is subjected to computation by the selected operator. That is to say, first, with regard to each content, the Pearson correlation between the users who have performed an evaluation as to the content is calculated.

For example, let us say that as a result of the blank columns of the temporary predictive matrix being filled, the temporary predictive matrix shown in FIG. 13 has been obtained. Note that, in FIG. 13, the shaded columns indicate the columns filled with the predictive evaluation value as to a non-input evaluation value. Let us say that the temporary predicting unit 51 takes interest in the evaluation (predictive evaluation value) as to the content C1 of the user U2 within the temporary predictive matrix, and obtains the Pearson correlation between the user U2 and another user who has performed an evaluation as to the content C1.

In such a case, the users who have input an evaluation value to the content C1 are the users U1, U4, and U6, so the Pearson correlation between these users and the user U2 is obtained. For example, in a case where the Pearson correlation between the user U1 and user U2 is obtained, the evaluation values (previously-input evaluation values or predictive evaluation values) as to the contents C2 through CM of the user U1, and the evaluation values as to the contents C2 through CM of the user U2 are employed to obtain the Pearson correlation.

In FIG. 13, as shown in the right side in the drawing, correlation values "0.593014", "0.83773", and "0.761491" indicating the degrees of the Pearson correlation between the users U2 and U1, between the users U2 and U4, and between the users U2 and U6 respectively are obtained.

For each user, with regard to a content wherein the user thereof has not performed an evaluation, upon obtaining the Pearson correlation between the user thereof and other users who have performed an evaluation as to the content thereof, the temporary predicting unit 51 performs sorting of the evaluation values based on the obtained correlation values. Specifically, for each user, with regard to a content wherein the user thereof has not performed an evaluation, the temporary predicting unit 51 sorts the evaluation values of the other users in the descending order of the correlation values.

For example, in the case of taking interest in the evaluation as to the content C1 of the user U2, as shown in FIG. 14, the evaluation values of the respective users are sorted in the descending order of the Pearson correlation with the user U2. In FIG. 14, the correlation values of the Pearson correlation with the user U2 are shown in the right side in the drawing. Upon sorting the evaluation values of the other users in the descending order of the correlation values, the temporary predicting unit 51 selects eight users in the descending order of the correlations with the user of interest, and obtains the mean value of the evaluation values as to a content on which the selected eight users pay attention. Subsequently, the temporary predicting unit 51 takes the obtained mean value as the predictive evaluation value as to the content to which the user of interest pays attention.

Accordingly, for example, with the example in FIG. 14, eight users U124, U987, U25, U539, U235, U169, U206, and U83 having a high correlation with the user U2 are selected. Subsequently, the mean value of the evaluation values "0.55", "0.83", "0.9", "1.21", "0.41", "0.88", "0.52", and "0.46" as to the content C1 of these selected users is obtained. Further, the temporary predicting unit 51 takes the obtained mean value "0.72" (0.72=(0.55+0.83+0.9+1.21+0.41+0.88+0.52+0.46)/8) as the predictive evaluation value as to the content C1 of the user U2.

Thus, upon computation of the portion W13 of the estimated expression Fk in FIG. 7, and the predictive evaluation value as to an unevaluated content being obtained regarding each user, the temporary predictive matrix Tk shown in FIG. 15 is obtained. Note that, in FIG. 15, the shaded columns indicate the columns filled with the predictive evaluation value as to a non-input evaluation value.

With the temporary predictive matrix Tk in FIG. 15, the evaluation column as to the content C1 of the user U2 is filled with the mean value "0.72" of the evaluation values of the top eight users having a high correlation, which has been obtained by computation of the portion W13 of the estimated expression Fk in FIG. 7. Also, unevaluated content columns are filled with the predictive evaluation value obtained by employing the Pearson correlation regarding each user.

Figure 16:
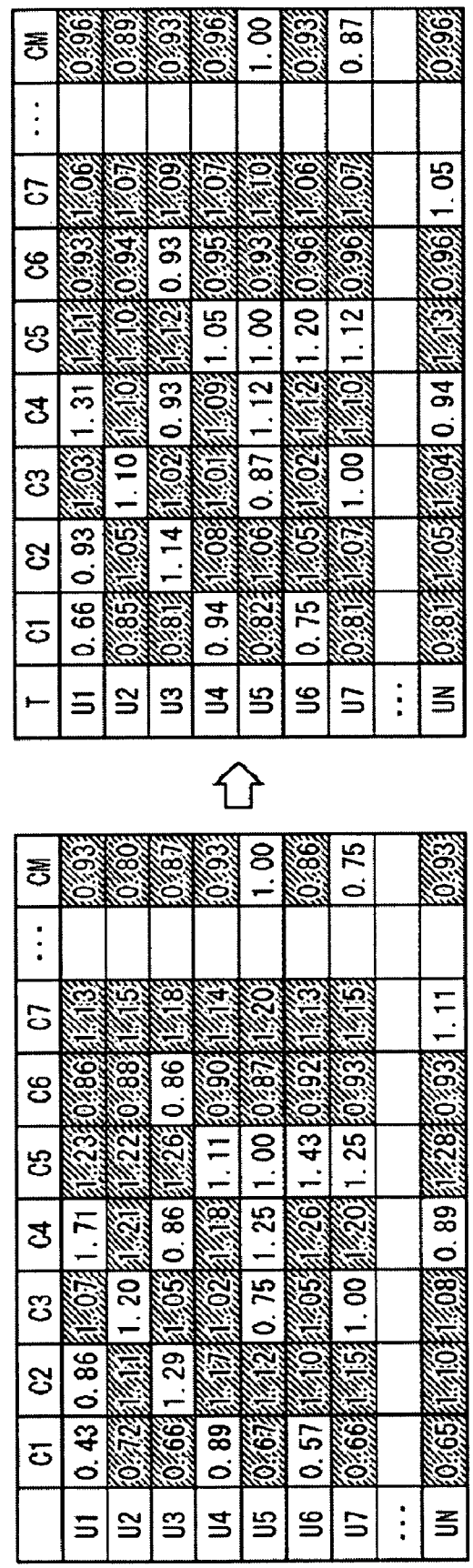
FIG. 16 is a diagram describing a specific example of computation of operators.

Upon the temporary predictive matrix Tk being subjected to computation of the portion W13 of the estimated expression Fk in FIG. 7, the temporary predicting unit 51 further subjects the temporary predictive matrix Tk to computation of the operator shown in the portion W14 of the estimated expression Fk in FIG. 7. Thus, as shown in FIG. 16, the square roots of the evaluation values of each column of the temporary predictive matrix Tk on the left side in the drawing are obtained, and consequently, the temporary predictive matrix Tk shown in the right side in the drawing is obtained. Note that, in FIG. 16, the shaded columns indicate the columns filled with the predictive evaluation value as to a non-input evaluation value.

For example, if we look at the evaluation column as to the content C1 of the user U1 within the temporary predictive matrix Tk, the square root of the evaluation value "0.43" in the temporary predictive matrix Tk shown in the left side in the drawing is obtained, and the corresponding column in the temporary predictive matrix Tk shown in the right side in the drawing is filled with the obtained square root value "0.66" $(0.66 \approx (0.43)^{1/2})$.

Figure 10:
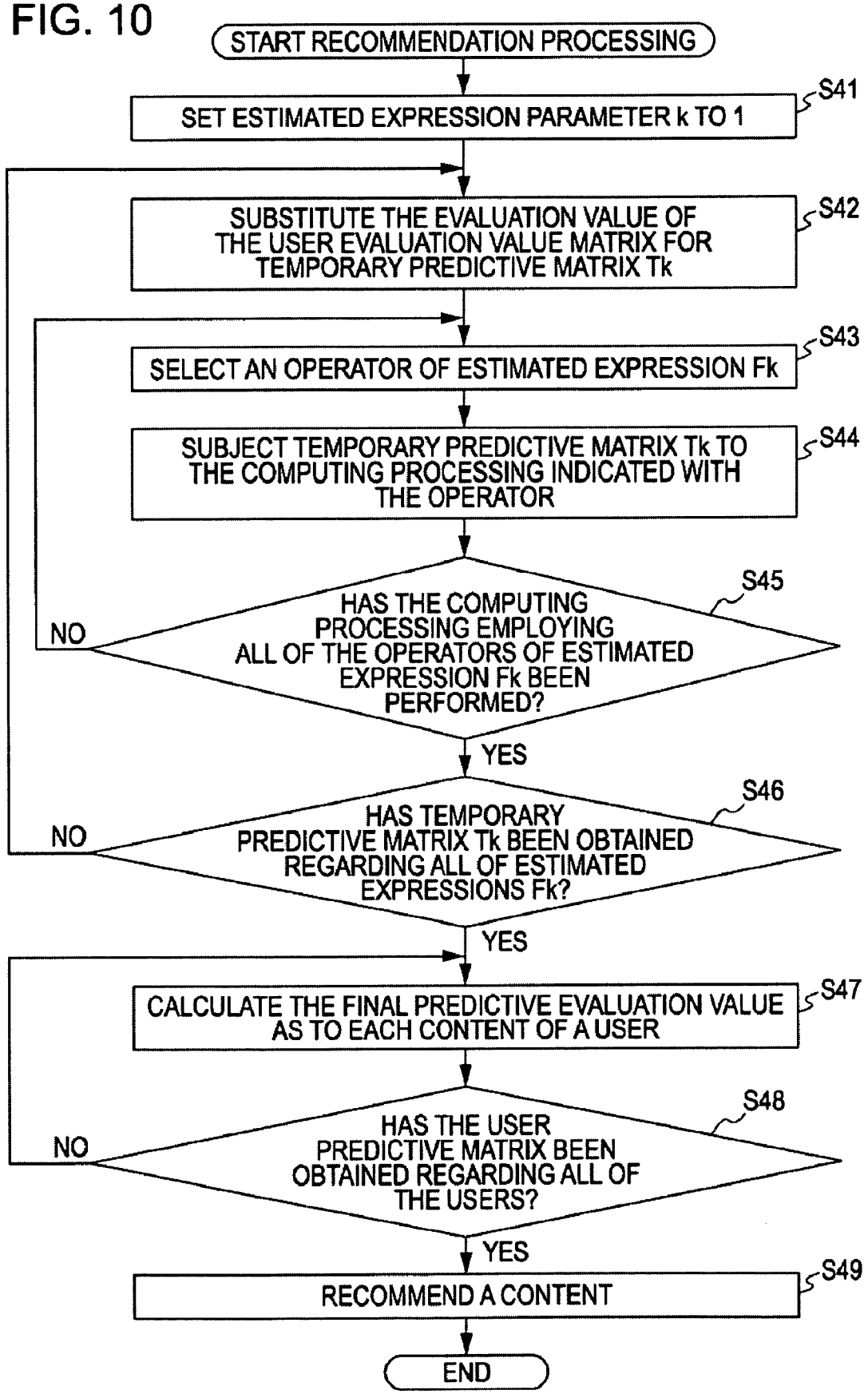
FIG. 10 is a flowchart describing recommendation processing.

Description will return to the flowchart in FIG. 10. Upon computation of all of the operators making up the estimated expression Fk being performed as described above, in step S45 determination is made that the arithmetic processing by all of the operators have been performed, and the processing proceeds to step S46.

In step S46, the temporary predicting unit 51 determines whether or not the temporary predictive matrix Tk has been obtained regarding all of the supplied estimated expressions Fk, i.e., whether or not computation employing the corresponding estimated expression Fk has been performed regarding all of the temporary predictive matrixes Tk. For example, in a case where the number of estimated expression parameters held by the temporary predicting unit 51 is the number K of the supplied estimated expressions, determination is made that the temporary predictive matrix Tk has been obtained regarding all of the estimated expressions Fk.

In a case where determination is made in step S46 that the temporary predictive matrix Tk has not been obtained regarding all of the estimated expressions Fk, the temporary predicting unit 51 increments the held estimated expression parameter k, and then the processing returns to step S42. Upon the estimated expression parameter being incremented, a new estimated expression Fk determined by the estimated expression parameter is selected, and processing as to the temporary predictive matrix Tk is performed by employing the selected estimated expression Fk.

Figure 17:
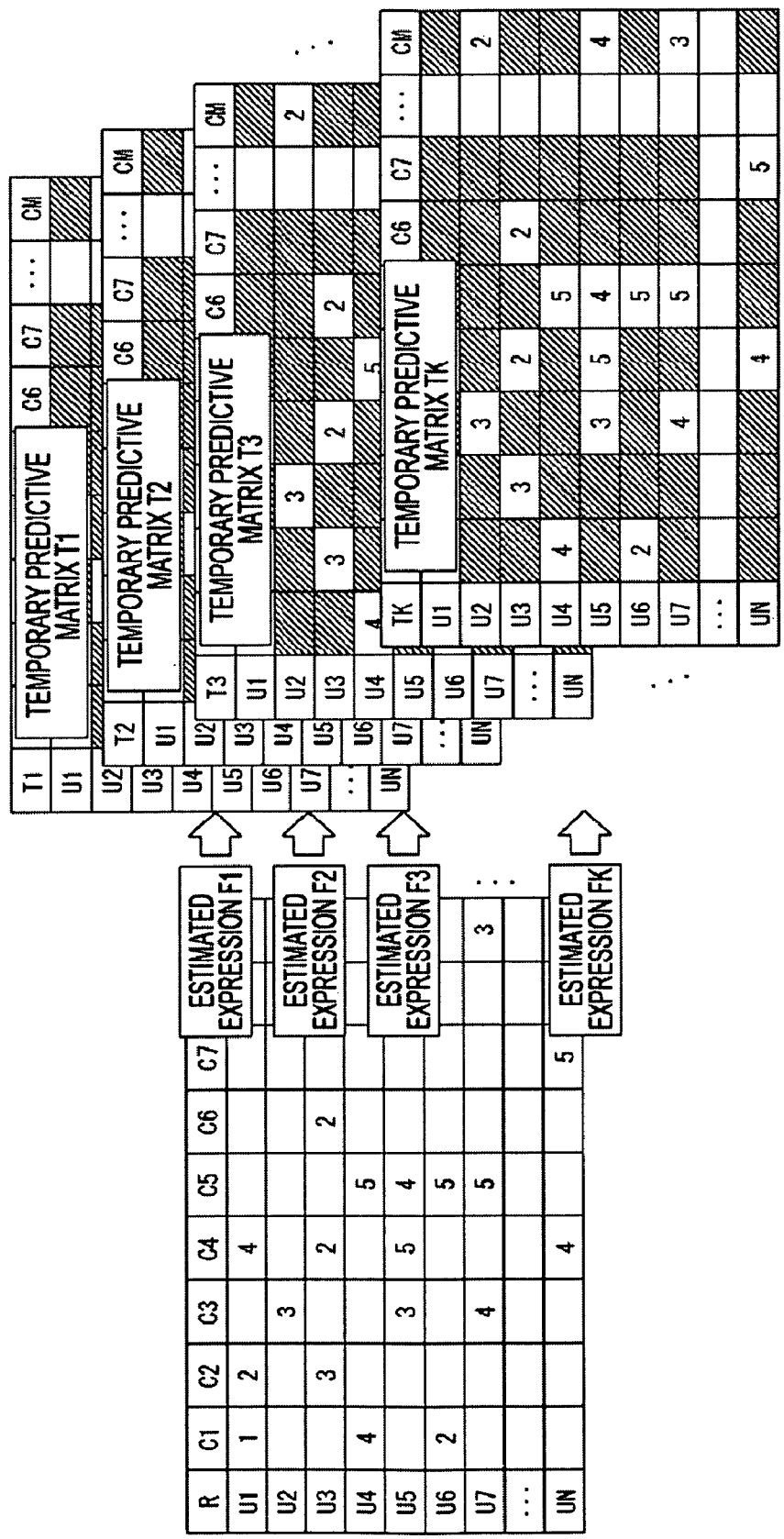
FIG. 17 is a diagram describing generation of temporary predictive matrixes.

On the other hand, in a case where determination is made in step S46 that the temporary predictive matrix Tk has been obtained regarding all of the estimated expressions Fk, the processing proceeds to step S47. In a case where the temporary predictive matrix Tk has been obtained regarding all of the estimated expressions Fk, for example, as shown in FIG. 17, the corresponding K temporary predictive matrixes T1 through TK are generated as to the supplied K estimated expressions F1 through FK, respectively. Consequently, a total of K temporary predictive matrixes are generated according to K estimated methods, respectively.

In step S47, the predicting unit 52 employs the temporary predictive matrix Tk from the temporary predicting unit 51, and the linear combination coefficient from the estimated expression holding unit 24 to calculate the final predictive evaluation value as to each content of the users Un (wherein 1≦n≦N).

That is to say, the predicting unit 52 selects one user Un of the users U1 through UN registered beforehand. For example, the users U1 through UN are sequentially selected. Subsequently, the predicting unit 52 extracts information made up of the evaluation value as to each content of the selected user Un within the temporary predictive matrix Tk supplied from the temporary predicting unit 51 as a temporary user predictive matrix Tnk. Thus, a total of K temporary user predictive matrixes Tnk of the user Un are obtained from the K temporary predictive matrixes Tk, respectively.

Figure 18:
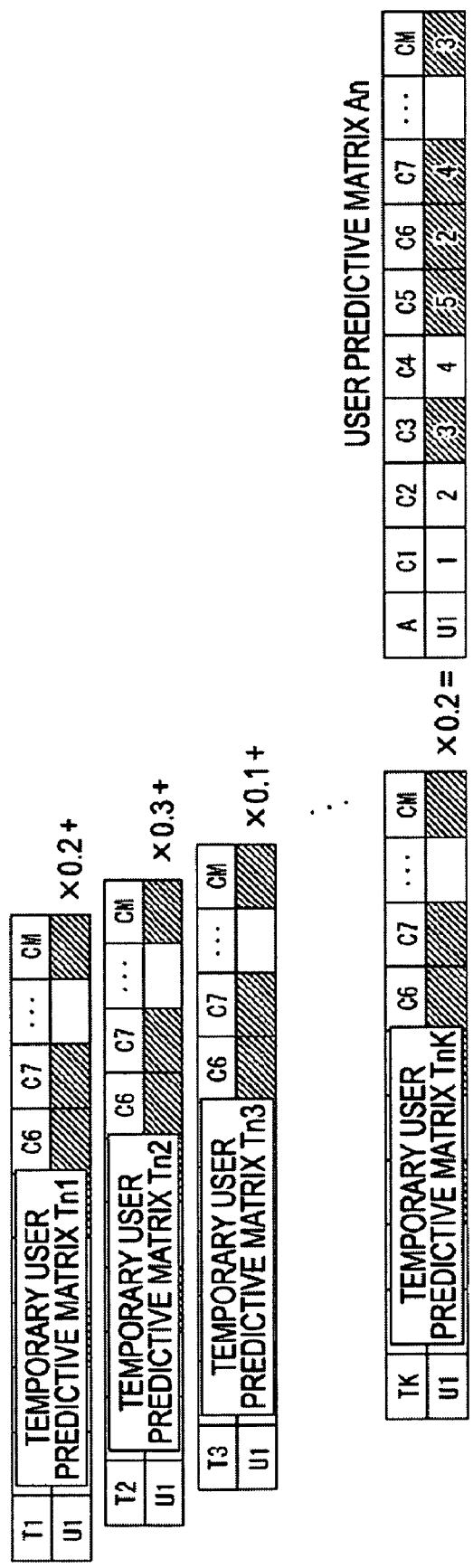
FIG. 18 is a diagram describing generation of user predictive matrixes.

Further, as shown in FIG. 18, the predicting unit 52 subjects the obtained K temporary user predictive matrixes Tn1 through TnK to linear combination by employing a linear combination coefficient bnk (wherein 0≦k≦K) of the user Un from the estimated expression holding unit 24. Thus, a user predictive matrix An made up of the final predictive evaluation value and previously-input evaluation value (previously-input evaluation value processed by computation) of the user Un is obtained.

More specifically, the predicting unit 52 obtains the user predictive matrix An of the user Un by computing the following Expression (1).

$$An = \left(\sum_{k=1}^{K} bnk \times Tnk\right) + bn0 \quad (1)$$

Note that, in Expression (1), (ΣbnkxTnk) indicates that the sum of the temporary user predictive matrix Tnk multiplied by the linear combination coefficients bnk is obtained by changing the variable k of the linear combination coefficient bnk and temporary user predictive matrix Tnk from 1 to K. Also, the linear combination coefficients bn1 through bnK are linear combination coefficients corresponding to the temporary user predictive matrixes Tn1 through TnK, and the linear combination coefficient bn0 is a coefficient to be added to the linear sum of the temporary user predictive matrix Tnk.

Accordingly, the user predictive matrix An of the user Un is obtained by adding the linear combination coefficient bn0 to the sum of the temporary user predictive matrix Tnk multiplied by the linear combination coefficient bnk. For example, the final predictive evaluation value as to the content Cm of the user Un is obtained by multiplying each predictive evaluation value as to the content Cm of the user Un within each temporary user predictive matrix Tnk by each linear combination coefficient bnk to obtain the sum of predictive evaluation values multiplied by the linear combination coefficient bnk, and further adding the linear combination coefficient bn0 to the sum thereof.

Upon obtaining the user predictive matrix An, the predicting unit 52 supplies the obtained user predictive matrix An to the predictive evaluation value matrix holding unit 26.

In step S48, the predicting unit 52 determines whether or not the user predictive matrix An has been obtained regarding all of the users. In a case where determination is made in step S48 that the user predictive matrix An has not been obtained regarding all of the users, the processing returns to step S47, where the user Un who has not been selected yet is selected, and the user predictive matrix An of the user Un thereof is obtained.

On the other hand, in a case where determination is made in step S48 that the user predictive matrix An has been obtained regarding all of the users, the processing proceeds to step S49. Upon the user predictive matrixes A1 through AN regarding all of the users U1 through UN being supplied from the predicting unit 52 to the predictive evaluation matrix holding unit 26, the predictive evaluation matrix holding unit 26 generates one predictive evaluation matrix A made up of the supplied N user predictive matrixes A1 through AN. Subsequently, the predictive evaluation matrix holding unit 26 holds the generated predictive evaluation matrix A, and supplies this to the recommendation unit 27.

In step S49, the recommendation unit 27 recommends a content to the user based on the predictive evaluation matrix supplied from the predictive evaluation matrix holding unit 26, and the recommendation processing ends. For example, the recommendation unit 27 generates recommendation information indicating a content to recommend regarding each user Un, with a content having the highest predictive evaluation value of the user Un as a content to be recommended to the user Un thereof. Subsequently, the recommendation unit 27 supplies the generated recommendation information to the interface processing device 11 to display this. Thus, the user views the displayed recommendation information, whereby the user can look for a new content to which is likely to interest the user.

As described above, the recommendation device 12 employs multiple estimated expressions to generate temporary predictive matrixes corresponding to these estimated expressions, and subjects the temporary predictive matrixes to linear combination by linear combination coefficients, thereby generating the final predictive matrix.

Thus, multiple temporary predictive matrixes as to multiple estimated expressions are subjected to linear combination by linear combination coefficients, thereby enabling a content estimated as a user's favorite to be detected with higher precision while considering each recommendation result obtained by multiple algorithms.

For example, with regard to a predetermined user Un, let us say that in the case of desiring to detect a content estimated as the user Un's favorite, there are an estimated expression F1 for extracting a content which is highly evaluated by all of the users, and an estimated expression F2 for extracting a content which is highly evaluated by a user having a high correlation with the user Un. In this case, upon a content to be recommended to the user Un being detected by employing the estimated expression F1 alone, the content obtained by the detection is not necessarily the user Un's favorite even if the evaluation by the whole user is high.

Conversely, upon a content to be recommended to the user Un being detected by employing the estimated expression F2 alone, detection of a content is performed while considering not the preference of all of the users but the preference of part of the users, so the content obtained by the detection is not necessarily the user Un's favorite.

On the other hand, the recommendation device 12 employs multiple estimated expressions optimized by the learning unit 23 to obtain the final estimation result by subjecting the estimation results by these estimated expressions to linear combination. Therefore, the final estimation result (predictive evaluation matrix) is obtained while considering multiple estimation methods such as all of the users, a user having a high correlation with the user Un, and so forth, whereby a content estimated as the user Un's favorite can be obtained with more precision.

Incidentally, an estimated expression and linear combination coefficient of each generation employed for generation of a predictive evaluation matrix are generated sequentially by the learning unit 23 performing learning processing employing the estimated expression of the previous generation. The learning processing by the learning unit 23 will be described below with reference to the flowchart in FIG. 19.

In step S81, the candidate generating unit 91 employs the K estimated expressions of the previous generation supplied from the estimated expression selecting unit 94 to perform estimated expression candidate generating processing, thereby generating S estimated expression candidates Js which are the candidates of estimated expressions of the next generation. Subsequently, the candidate generating unit 91 supplies the generated estimated expression candidates Js to the estimation results computing unit 92.

In step S82, the estimation results computing unit 92 performs estimation processing by employing the estimated expression candidates Js from the candidate generating unit 91, and the user evaluation matrix from the user evaluation matrix holding unit 22 to estimate the respective evaluation values in the user evaluation matrix, thereby calculating estimation results Hs for each estimated expression candidate. The estimation results computing unit 92 supplies the calculated estimation results Hs and estimated expression candidates Js to the estimated expression selecting unit 94.

Note that the details regarding the estimated expression candidate generating processing and estimation processing will be described later.

In step S83, the group generating unit 93 performs clustering of the users based on the user evaluation matrix supplied from the user evaluation matrix holding unit 22. Specifically, the group generating unit 93 employs the user profile supplied as appropriate to classify each of the registered users U1 through UN into any one of predetermined Q user groups G1 through GQ.

Figures 19, 20:
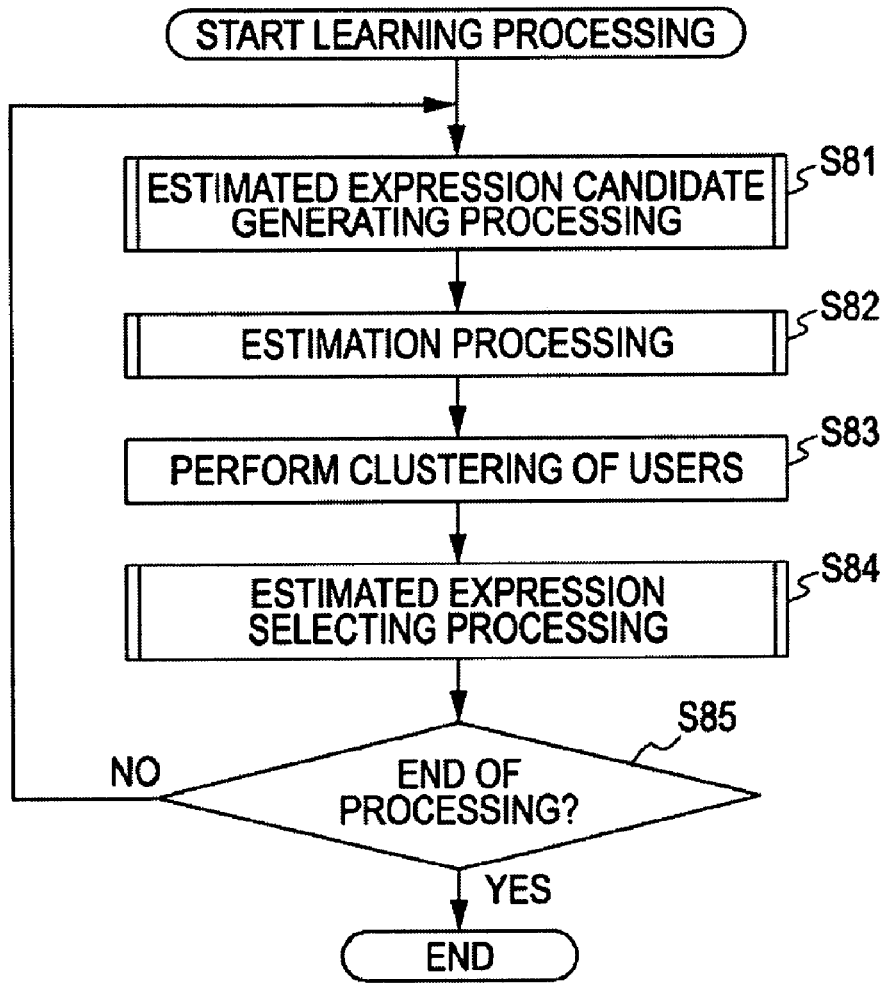
FIG. 19 is a flowchart describing learning processing.
FIG. 20 is a diagram describing grouping of users.

For example, the group generating unit 93 performs clustering by the K-means method based on the evaluation values as to the contents of each user in the supplied user evaluation matrix to perform grouping of the users U1 through UN. Thus, as shown in FIG. 20, each user is classified into one of any user group of the user groups G1 through GQ. For example, in FIG. 20, grouping is performed such that the users U1, U3, U10, and U152 belong to the user group G1.

Description will return to the flowchart in FIG. 19. Upon performing grouping of the users, the group generating unit 93 supplies user group information indicating the grouping results thereof to the estimated expression selecting unit 94.

In step S84, the estimated expression selecting unit 94 employs the user evaluation matrix from the user evaluation matrix holding unit 22, the estimation results Hs and estimated expression candidates Js from the estimation results computing unit 92, and the user group information from the group generating unit 93 to perform estimated expression selecting processing, thereby generating the estimated expression and linear combination coefficient of the next generation. Subsequently, the estimated expression selecting unit 94 supplies the generated estimated expression and linear combination coefficient to the candidate generating unit 91 and estimated expression holding unit 24. The estimated expression holding unit 24 holds the estimated expression and linear combination coefficient from the estimated expression selecting unit 94. Note that the details of the estimated expression selecting processing will be described later.

In step S85, the learning unit 23 determines whether to end the processing for generating the estimated expression and linear combination coefficient of the next generation. For example, in a case where pause of the operation of the content recommendation system is instructed, determination is made that the processing is ended.

In a case where determination is made in step S85 that the processing is not ended, the processing returns to step S81, where the estimated expression and linear combination coefficient of the next generation are generated. On the other hand, in a case where determination is made in step S85 that the processing is ended, each unit of the learning unit 23 stops the processing being performed, and the learning processing ends.

Thus, the learning unit 23 generates the estimated expression and linear combination coefficient of the next generation by the genetic programming employing the estimated expression of the previous generation. Thus, the estimated expression and linear combination coefficient of the next generation are generated by the genetic programming, thereby enabling a more appropriate predictive evaluation value as to each content of a user to be obtained.

Moreover, with the learning unit 23, a recommendation algorithm for recommending a content to a user more easily and rapidly can be established without instructions of an administrator or the like of the recommendation device 12. That is to say, an estimated expression capable of estimating a predictive evaluation value more precisely can be obtained, and a more suitable combination of estimated expressions, and linear combination coefficient can be obtained.

Next, description will be made regarding the estimated expression candidate generating processing corresponding to the processing in step S81 in FIG. 19, with reference to the flowchart in FIG. 21.

In step S121, the candidate generating unit 91 determines whether or not this learning is the first learning. Specifically, upon the learning being performed, an estimated expression and linear combination coefficient are generated, and the estimated expression is supplied from the estimated expression selecting unit 94 to the candidate generating unit 91. On the other hand, in a case where this learning is completely the first learning, neither estimated expressions nor linear combination coefficients have been generated, so no estimated expression is supplied to the candidate generating unit 91. Accordingly, in a case where no estimated expression is supplied from the estimated expression selecting unit 94, the candidate generating unit 91 determines that this learning is the first learning.

In a case where determination is made in step S121 that this learning is the first learning, in step S122 the candidate generating unit 91 sets the number of selections NumSlct=0, the number of mutations NumMts=0, the number of intersections NumCrs=0, and the number of random generations NumRnd=S.

Here, the number of selections NumSlct indicates the number of estimated expressions selected as the estimated expressions Js of the next generation, of the estimated expressions of the previous generation. Also, the number of mutations Num- Mts, number of intersections NumCrs, and number of random generations NumRnd indicate the number of estimated candidates Js generated in mutation processing, intersection processing, and ransom processing, respectively.

There is no estimated expression of the previous generation at the time of the first learning, so the number of random generations is set to S, and all of the S estimated expression candidates are generated at the random processing. Upon the number of selections, number of mutations, number of intersections, and number of random generations being determined, the processing proceeds to step S124.

On the other hand, in a case where determination is made in step S121 that this learning is not the first learning, in step S123 the candidate generating unit 91 sets the number of selections NumSlct=K, the number of mutations NumMts= (S−K)/3, the number of intersections NumCrs=(S−K)/3, and the number of random generations NumRnd=S−(2×(S−K)/3)−K.

That is to say, K estimated expressions of the previous generation supplied from the estimated expression selecting unit 94, i.e., all of the estimated expressions of the previous generation are set to the estimated expression candidates of the next generation. Also, according to the mutation processing, intersection processing, and random processing, the estimated expression candidates Js are generated for each ⅓ worth of the number obtained by subtracting K from the sum S of the respective estimated expressions candidates. Upon the number of selections, number of mutations, number of intersections, and number of random generations being determined, the processing proceeds to step S124.

Upon the number of selections, number of mutations, number of intersections, and number of random generations being determined in step S122 or S123, in step S124 the candidate generating unit 91 selects estimated expression candidates from the estimated expressions of the previous generation supplied from the estimated expression selecting unit 94 by the number indicated with the number of selections Numslct. For example, in a case where the number of selections NumSlct=K, all of the supplied K estimated expressions F1 through FK of the previous generation are taken as estimated expression candidates J1 through JK.

In step S125, the mutation processing unit 111 employs the estimated expressions supplied from the estimated expression selecting unit 94 to perform the mutation processing, thereby generating estimated expression candidates Js by the number indicated with the number of mutations NumMts.

That is to say, the mutation processing unit 111 selects one estimated expression arbitrarily from the estimated expressions F1 through FK of the previous generation. Subsequently, the mutation processing unit 111 subjects the selected estimated expression to insertion of an operator, elimination of an operator, modification of the processing axis parameter, modification of a parameter within an operator, switching of the order of operators, or the like, thereby generating one estimated expression candidate.

For example, let us say that the estimated expression shown in FIG. 22A has been selected from the estimated expressions of the previous generation. The estimated expression shown in FIG. 22A is made up of three portions W31 through W33, and the portions W31 through W33 include an operator "NormalizeMaxMin", "Sin", and "CF-Correl(1)", respectively.

For example, upon a new processing axis parameter and operator being added between the portions W32 and W33 in the estimated expression in FIG. 22A by the mutation processing, the estimated expression candidate shown in FIG. 22B is generated. With the estimated expression candidate shown in FIG. 22B, a new processing axis parameter "C#", and operator "FillAvg" are added between the portions W32 and W33 in the estimated expression in FIG. 22A.

Also, upon a portion of the estimated expression in FIG. 22A being eliminated by the mutation processing, for example, the estimated expression candidate shown in FIG. 22C is generated. With the estimated expression candidate shown in FIG. 22C, the portion W31 of the estimated expression in FIG. 22A is eliminated.

Further, upon the processing axis parameter of the portion W31 in the estimated expression in FIG. 22A being modified, the estimated expression candidate shown in FIG. 22D is generated. With the estimated expression candidate shown in FIG. 22D, the processing axis parameter "U#" of the portion W31 of the estimated expression in FIG. 22A is changed to "C#".

Further, after the estimated expression in FIG. 22A is changed to the state in FIG. 22D by the mutation processing, further upon the parameter within the operator "CF-Correl (1)" in the estimated expression being modified, for example, the estimated expression candidate shown in FIG. 22E is generated. With the estimated expression candidate shown in FIG. 22E, the parameter of the right-end operator "CF-Correl (1)" in the estimated expression in FIG. 22D is changed to "CF-Correl(5)".

Further, also, after the estimated-expression in FIG. 22A is changed to the state in FIG. 22E by the mutation processing, further upon the order of the operators being switched, for example, the estimated expression candidate shown in FIG. 22F is generated. With the estimated expression candidate shown in FIG. 22F, the order between the operator "Sin" and operator "CF-Correl(5)" of the estimated expression in FIG. 22E is switched to "U;C#CF-Correl(5), Sin".

Thus, a portion of an estimated expression is changed to a new estimated expression candidate by the mutation processing. Note that, in a case where the user evaluation matrix is subjected to computation by employing the generated estimated expression candidate, when an estimated expression candidate whereby the blank columns of the user evaluation matrix are not filled, i.e., an estimated expression candidate whereby the predictive evaluation value of a non-input evaluation value is not obtained, is generated, the estimated expression candidate thereof is not employed, and an estimated expression candidate is regenerated.

Description will return to the flowchart in FIG. 21. Upon an estimated expression candidate being generated by the mutation processing, in step S126 the intersection processing unit 112 employs the estimated expression supplied from the estimated expression selecting unit 94 to perform the intersection processing, thereby generating estimated expression candidates Js by the number indicated with the number of intersections NumCrs.

That is to say, the intersection processing unit 112 selects two estimated expressions arbitrarily from the estimated expressions F1 through FK of the previous generation. Subsequently, the intersection processing unit 112 switches a portion of the selected two estimated expressions, thereby generating one new estimated expression candidate.

Figure 23:
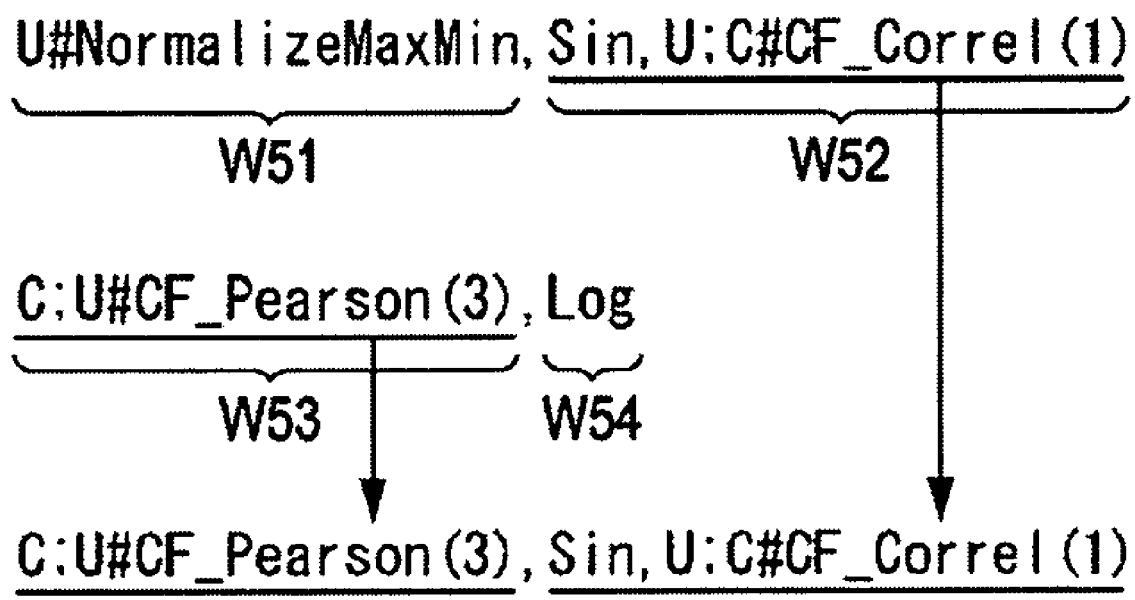
FIG. 23 is a diagram describing examples of intersection processing.

For example, as shown in FIG. 23, let us say that an estimated expression made up of portions W51 and W52, and an estimated expression made up of portions W53 and W54 have been selected. Here, the portion W52 includes two operators "Sin" and "CF-Correl(1)", and the portion W53 includes one operator "CF-Correl(3)". Subsequently, upon the portion W51 of the estimated expression made up of the portions W51 and W52 being switched (changed) to the portion W53 of the other estimated expression, a new estimated expression candidate "C;U#CF-Pearson(3), Sin, U;C#CF-Correl(1)" shown in the lower side in the drawing is generated.

Thus, a portion of an estimated expression is switched to a portion of another estimated expression by the intersection processing, and is taken as a new estimated expression. Note that, in a case where the user evaluation matrix is subjected to computation by employing the generated estimated expression candidate, when an estimated expression candidate whereby the blank columns of the user evaluation matrix are not filled is generated, the estimated expression candidate thereof is not employed, and an estimated expression candidate is regenerated.

Description will return to the flowchart in FIG. 21. Upon an estimated expression candidate being generated by the intersection processing, in step S127 the random processing unit 113 performs the random processing, thereby generating estimated expression candidates Js by the number indicated with the number of random generations NumRnd.

That is to say, the random processing unit 113 combines randomly an arbitrary processing axis parameter, and an operator of an arbitrary parameter to generate an estimated expression candidate. In this case, the number and order of operators are also determined randomly. Note that, in a case where the user evaluation matrix is subjected to computation by employing the generated estimated expression candidate, when an estimated expression candidate whereby the blank columns of the user evaluation matrix are not filled is generated, the estimated expression candidate thereof is not employed, and an estimated expression candidate is regenerated.

Upon estimated expression candidates being generated by the number of selections, number of mutations, number of intersections, and number of random generations, the generated estimated expression candidates J1 through JS thereof are supplied from the candidate generating unit 91 to the estimation results computing unit 92, and the estimated expression candidate generating processing ends, and the processing proceeds to step S82 in FIG. 19.

Thus, the candidate generating unit 91 generates estimated expression candidates of the next generation by employing the estimated expressions of the previous generation. Thus, estimated expression candidates of the next generation are generated from the estimated expressions of the previous generation, whereby a more suitable estimated expression can be obtained in a case where several combinations of the estimated expression candidates are evaluated, and an evaluation as to a content of a user is estimated.

Figure 24:
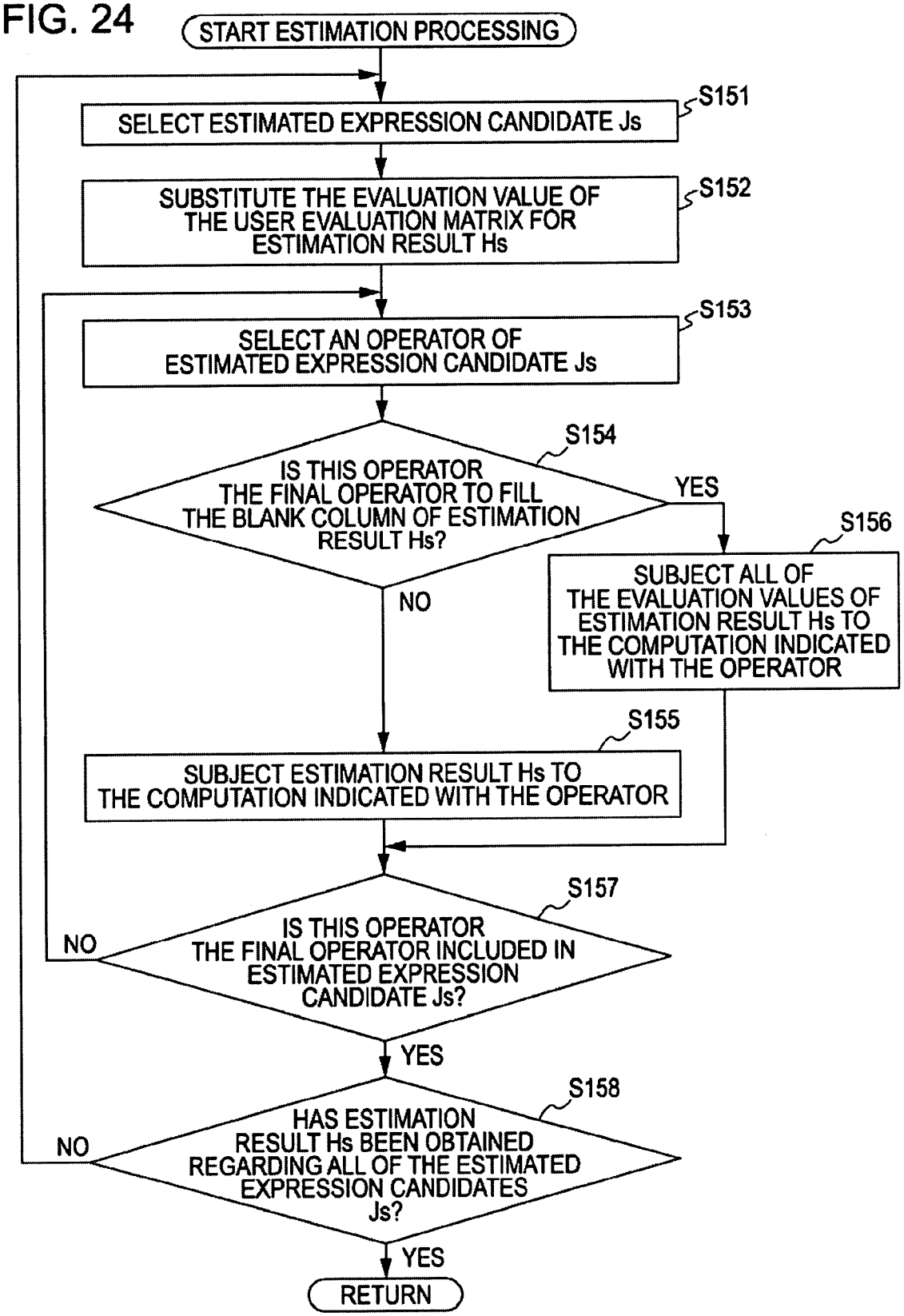
FIG. 24 is a flowchart describing estimation processing.

Next, the estimation processing which is processing corresponding to the processing in step S82 in FIG. 19 will be described with reference to the flowchart in FIG. 24.

In step S151, the estimation results computing unit 92 selects one of the S estimated expression candidates J1 through JS supplied from the candidate generating unit 91 as an estimated expression candidate employed for the processing. For example, the estimated expression candidate Js (wherein $1 \leqq s \leqq S$) employed for the processing is selected from the estimated expression candidates J1 through JS sequentially.

In step S152, the estimation results computing unit 92 takes the same matrix (information) as the user evaluation matrix supplied from the user evaluation matrix holding unit 22 as the estimation result Hs as to the selected estimated expression candidate Js, and substitutes the evaluation value of each column of the user evaluation matrix for each column of the estimation result Hs. That is to say, the same information as the user evaluation matrix is taken as the estimation result Hs.

In step S153, the estimation results computing unit 92 selects one operator of the estimated expression candidate Js employed for the processing. For example, in a case where the estimated expression candidate shown in FIG. 25 is taken as the estimated expression candidate Js, in FIG. 25, from the left-sided operator to the right-sided operator are selected sequentially in the right direction. In FIG. 25, the estimated expression candidate Js includes four operators "CF-Pearson(3)", "Sin", "CF-Correl(1)", and "Cos", which are selected in this order.

In step S154, the estimation results computing unit 92 determines whether or not the selected operator is the last operator to fill a blank column of the estimation result Hs.

For example, the estimated expression candidate Js shown in FIG. 25 includes four operators. Of these operators, operators "CF-Pearson(3)" and "CF-Correl(1)" are operators to fill a blank column of the estimation result Hs by employing the Pearson correlation and correlation according to a cosine distance, respectively, i.e., operators for obtaining the predictive evaluation value of a non-input evaluation value. On the other hand, operators "Sin" and "Cos" are operators for obtaining the sine and cosine of an evaluation value, and are not operators to fill a blank column of the estimation result Hs.

Also, with the estimated expression candidate Js, the operators "CF-Pearson(3)", "Sin", "CF-Correl(1)", and "Cos", are selected in this order and employed for the processing. Accordingly, with the estimated expression candidate Js, the last operator to fill a blank column of the estimation result Hs is the operator "CE-Correl(1)", and in a case where this operator has been selected, determination is made in step S154 that this operator is the last operator.

In a case where determination is made in step S154 that the selected operator is not the last operator, in step S155 the estimation results computing unit 92 subjects the estimation result Hs to the computation indicated by the selected operator.

Here, in a case where the selected operator is an operator with the evaluation values of all of the columns of the estimation result Hs as objects, e.g., operator "Sin" for computing the sine of the evaluation value of each column, the estimation results computing unit 92 subjects the evaluation value of each column of the estimation result Hs to the computation indicated by the selected operator. Also, in a case where the selected operator is an operator to fill a blank column of the estimation result Hs, the estimation results computing unit 92 employs the evaluation value of each column of the estimation result Hs, i.e., a previously-input evaluation value and non-input evaluation value to obtain the predictive evaluation value of the non-input evaluation value.

Upon the computation of the selected operator being performed, the processing proceeds from step S155 to step S157.

On the other hand, in a case where determination is made in step S154 that the selected operator is the last operator, in step S156 the estimation result computing unit 92 subjects all of the evaluation values of the estimation result Hs to the computation indicated by the selected operator.

Specifically, the estimation results computing unit 92 obtains, of the evaluation value of each column of the estimation result Hs, not only a non-input evaluation value but also the predictive evaluation value of a previously-input evaluation value at the time of the computation by the last operator to fill a blank column. Note that, in this case as well, with the computation of the operator to fill a blank column of the estimation result Hs, the evaluation value of a column to be calculated is not employed for the computation for obtaining the predictive evaluation value of the column thereof.

Thus, a predictive evaluation value is also obtained regarding a column to which a previously-input evaluation value is input at the time of the computation by the last operator to fill a blank column, whereby the precision of prediction (estimation) of an estimated expression candidate can be evaluated by employing the predictive evaluation value obtained regarding the column thereof, and the previously-input evaluation value of the corresponding column in the user evaluation matrix. Upon the computation of the selected operator being performed in step S156, subsequently, the processing proceeds to step S157.

In step S157, the estimation results computing unit 92 determines whether or not the selected operator of the estimated expression candidate Js is the last operator included in the estimated expression candidate Js. For example, in a case where the estimated expression candidate Js shown in FIG. 25 has been selected, when the selected operator of the estimated expression candidate Js is the operator "Cos" of which the computation is performed last, the selected operator is determined as the last operator.

In a case where determination is made in step S157 that the selected operator is not the last operator, the processing returns to step S153, where the next operator is selected, and computation as to the estimation result Hs is performed.

On the other hand, in a case where determination is made in step S157 that the selected operator is the last operator, in step S158 the estimation results computing unit 92 determines whether or not the estimation result Hs has been obtained regarding all of the supplied estimated expression candidates Js.

Figure 26:
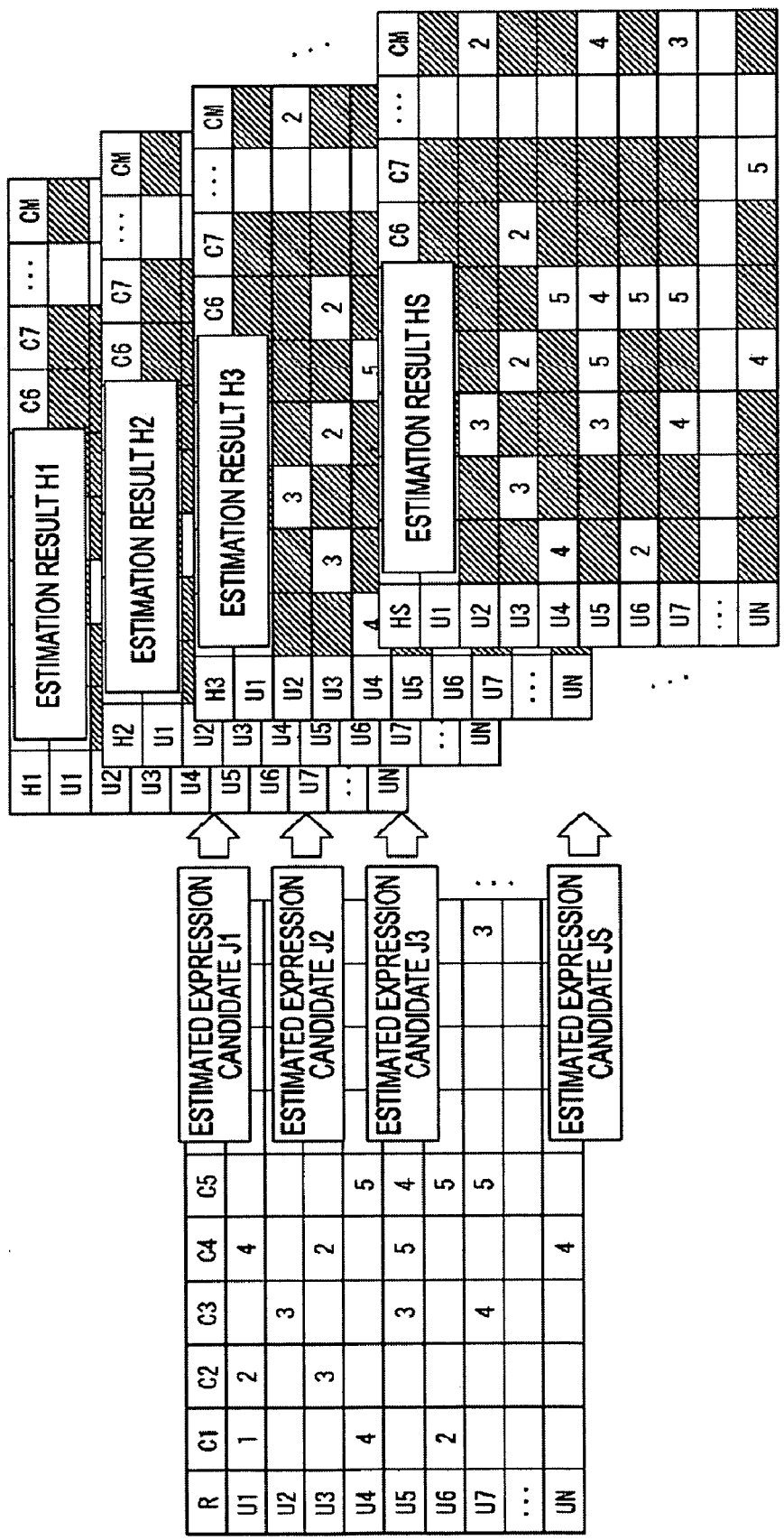
FIG. 26 is a diagram describing generation of estimation results.

For example, in a case where determination is made that the estimation result Hs has been obtained regarding all of the supplied estimated expression candidates Js, as shown in FIG. 26, as to the supplied S estimated expression candidates J1 through JS, the corresponding S estimation results H1 through HS are obtained, respectively. That is to say, according to S estimation methods, a total of S estimation results are generated, respectively.

In a case where determination is made in step S158 that the estimation result Hs has not been obtained regarding all of the estimated expression candidates is, the processing returns to step S151, where the above-mentioned processing is repeated. Specifically, the next estimated expression candidate Js is selected, and the estimation result Hs corresponding to the estimated expression candidate Js thereof is generated.

On the other hand, in a case where determination is made in step S158 that the estimation result Hs has been obtained regarding all of the estimated expression candidates Js, the estimation results computing unit 92 supplies the obtained S estimation results H1 through HS, and estimated expression candidates J1 through JS to the estimated expression selecting unit 94. Subsequently, upon the estimated expression candidate and estimation result being supplied from the estimation result computing unit 92 to the estimated expression selecting unit 94, the estimation processing ends, and the processing proceeds to step S83 in FIG. 19.

Thus, the estimation results computing unit 92 employs the S estimated expression candidates to generate the corresponding estimation results, respectively. Thus, an estimated expression candidate is employed to generate the corresponding estimation result, whereby a more suitable combination of estimated expressions can be obtained in a case where a combination of estimated expression candidates is evaluated, and an evaluation as to a content of a user is estimated.

Next, the estimated expression selecting processing corresponding to the processing in step S84 in FIG. 19 will be described with reference to the flowchart in FIG. 27.

In step S191, the combination coefficient calculating unit 114 initializes a variable Z indicating the use situation for each estimation result Hs supplied from the estimation results computing unit 92.

That is to say, with the estimated expression selecting unit 94, an assumption is made that some of the S estimated expression candidates are selected, and the selected estimated expression candidates Js are employed as estimated expressions of the next generation. Subsequently, with regard to a case where the selected estimated expression candidates Js are employed to obtain the predictive evaluation value of each user, the predictive evaluation value thereof, i.e., the precision of prediction of the estimation result Hs is evaluated.

The variable Z is made up of information indicating the use situation of the estimation result Hs corresponding to each of the estimated expression candidates Js, and the use situation thereof indicates whether or not the estimated expression candidate corresponding to the estimation result is temporarily employed as an estimated expression of the next generation. That is to say, with the variable Z, the estimated expression candidate corresponding to the estimation result of which the use situation is set to "used" is an estimated expression candidate temporarily employed as an estimated expression of the next generation. Also, with the variable Z, the estimated expression candidate corresponding to the estimation result of which the use situation is set to "unused" is an estimated expression candidate temporarily not employed as an estimated expression of the next generation.

The combination coefficient calculating unit 114 initializes the variable Z by setting the use situation of each estimation result with the variable Z to "unused".

In step S192, the combination coefficient calculating unit 114 selects one of the estimated expression candidates Js (wherein $2 \leq s \leq S$) supplied from the estimation results computing unit 92. For example, the estimated expression candidates Js are selected sequentially from the estimated expression candidate J1 to the estimated expression candidate JS.

In step S193, the combination coefficient calculating unit 114 inverts the use situation of the estimation result Hs corresponding to the selected estimated expression candidate Js, and takes the variable Z, of which the use situation is inverted, as a variable Zs' (wherein $1 \leq s \leq S$). For example, in a case where the use situation of the estimation result Hs corresponding to the selected estimated expression candidate Js with the variable Z is "unused", the use situation is inverted to "used", and conversely, in a case where the use situation is "used", the use situation is inverted to "unused".

In step S194, the combination coefficient calculating unit 114 determines whether or not the number of use situations which are "used", i.e., the number of estimated expression candidates corresponding to the estimation result of which the use situation is "used" is at or below the upper limit number Kmax of the number K of predetermined estimated expressions.

In a case where determination is made in step S194 that the number of use situations which are "used" is at or below the upper limit number Kmax, in step S195 the combination coefficient calculating unit 114 references the user group information supplied from the group generating unit 93 to select one user group Gq. For example, the user group Gq (wherein $1 \leq q \leq Q$) is selected sequentially from the user group G1 to user group GQ.

In step S196, the combination coefficient calculating unit 114 selects, of the estimation results Hs supplied from the estimation results computing unit 92, the estimation result Hs of which the use situation with the variable Zs' is "used", and takes the selected estimation result Hs newly as an estimation result Hv'. Note that, in a case where there are multiple new estimation results Hv', the variable v in these estimation results Hv' is appended so as to become a consecutive number.

For example, let us say that, with the variable Zs', the use situations of the estimation results H1 through HV (wherein $1 \leq V \leq S$) are "used", and the use situations of the other estimation results H(V+1) through HS are "unused". In this case, the combination coefficient calculating unit 114 takes the estimation results H1 through HV newly as estimation results H1' through HV', and takes the estimated expression candidates Js corresponding to the estimation results H1' through HV' newly as estimated expression candidates J1' through JV'.

In step S197, the combination coefficient calculating unit 114 employs the estimation result Hv', the user evaluation matrix from the user evaluation matrix holding unit 22, and the user group information from the group generating unit 93 to obtain linear combination coefficient candidates Bsq regarding the selected user group Gq.

Here, the linear combination coefficient candidates Bsq regarding the selected user group Gq are linear combination coefficient candidates of the user Un belonging to the user group Gq, and the linear combination coefficient candidates Bsq are made up of (V+1) linear combination coefficients bsq0 through bsqV, corresponding to the linear combination coefficient bnk. That is to say, the linear combination coefficient candidates Bsq are linear combination coefficients in a case where the estimated expression candidates J1' through JV' are employed as new estimated expressions of the next generation.

Note that the variables s, q, and v in each of the linear combination coefficients bsqv (wherein $0 \leq v \leq V$) correspond to s of the variable Zs', q of the user group Gq, and v of the estimation result Hv', respectively. Also, the linear combination coefficient bsq0 is a coefficient corresponding to the linear combination coefficient bn0.

For example, the combination coefficient calculating unit 114 employs linear regression to obtain the linear combination coefficient candidates Bsq wherein an error matrix Eq made up of predetermined elements in the following Expression (2) becomes the minimum, i.e., a combination of the linear combination coefficients bsqv.

$$Rq = \left( \sum_{v=1}^{V} bsqv \times Hqv' \right) + bsq0 + Eq \qquad (2)$$

In Expression (2), a matrix Rq is a matrix (vector) with a previously-input evaluation value as to a content of a user belonging to the user group Gq in the user evaluation matrix as an element.

Also, a matrix Hqv' in Expression (2) is a matrix (vector) with a predictive evaluation value corresponding to a previously-input evaluation value as to a content of a user belonging to the user group Gq in the user evaluation matrix as an element, of the predictive evaluation values of the estimation result Hv'. That is to say, a predetermined element rq of the matrix Rq is a true evaluation value as to a predetermined content Cm of a predetermined user Un, an element hqv of the matrix Hqv' corresponding to the element rq thereof is a predictive evaluation value of an evaluation as to the content Cm of the user Un estimated by employing the estimated expression candidate Jv'.

Further, in Expression (2), ($\Sigma$bsqv×Hqv') indicates that the variable v of the linear combination coefficient bsqv and matrix Hqv' is changed from 1 to V, thereby obtaining the sum of the matrix Hqv' multiplied by the linear combination coefficient bsqv.

According to Expression (2), the linear combination coefficient bsq0 and the element eq of the error matrix Eq are added to the sum of the elements hq1 through hqV of the matrixes Hq1' through HqV', which correspond to the element rq of the matrix Rq, multiplied by the linear combination coefficients bsq1 through bsqv respectively, and consequently, the obtained result is equal to the element rq. That is to say, the element eq indicates the error between the estimation value of the element rq obtained by adding the linear combination coefficient bsq0 to the sum of the element hqv multiplied by the linear combination coefficient bsqv, and the true element rq.

Accordingly, the smaller the element eq is, the more an evaluation as to a content of a user can be estimated with precision by employing a combination of the linear combination coefficient bsqv at that time, and the estimated expression candidate Jv' corresponding to the estimation result Hv'. Therefore, the combination coefficient calculating unit 114 obtains combinations of linear combination coefficients bsqv such that the relation of Expression (2) holds, and the respective elements eq become the minimum, and takes the combinations thereof as the linear combination coefficient candidates Bsq.

Upon the linear combination coefficient candidates Bsq of the user group Gq regarding the variable Zs' being obtained, the processing proceeds from step S197 to step S198.

In step S198, the combination coefficient calculating unit 114 determines whether or not the linear combination coefficient candidates Bsq have been obtained regarding the whole user group Gq.

In a case where determination is made in step S198 that the linear combination coefficient candidates Bsq have not been obtained regarding the whole user group Gq, the processing returns to step S195, where the above-mentioned processing is repeated. Specifically, the next user group Gq is selected, and the linear combination coefficient candidates Bsq of the newly selected user group Gq regarding the variable Zs' are obtained.

On the other hand, in a case where determination is made in step S198 that the linear combination coefficients Bsq have been obtained regarding the whole user group Gq, the processing proceeds to step S199. For example, in a case where determination is made that the linear combination coefficient candidates have been obtained regarding the whole user group, the linear combination coefficient candidates Bs1 through BsQ are obtained as to the user groups G1 through GQ regarding the variable Zs', respectively.

In step S199, the evaluating unit 115 calculates AIC (Akaike Information Criteria) regarding the variable Zs' based on the user evaluation matrix, and estimation result Hv', i.e., the calculation result of the linear combination coefficient by Expression (2). That is to say, the evaluating unit 115 calculates the following Expression (3), thereby calculating AIC regarding the variable Zs' as information quantity reference which is the evaluation index of the estimated expression candidates Jv and linear combination coefficient candidates Bsq for estimating an evaluation as to a content of a user.

$$AIC = W \times \{\log(2 \times PI) + 1 + \log \|E\|^2 / W\} + 2 \times Q \times (v+1). \qquad (3)$$

In Expression (3), W denotes the number of previously-input evaluation values in the user evaluation matrix, and PI denotes n. Also, in Expression (3), ||E|| denotes the norm of a matrix E made up of the elements of error matrixes E1 through EQ, i.e., the sum of squares of the respective elements of the matrix E. Further, in Expression (3), Q and V denote the number of the user groups Gq, and the number of estimation results Hv, respectively.

The smaller the element of the matrix E becomes, the smaller the AIC shown in Expression (3) becomes. That is to say, the more the variable Zs' as to the estimated expression candidates Jv' and linear combination coefficient candidates Bsq can estimate an evaluation as to a content of a user precisely, the smaller the AIC of the variable Zs' becomes.

Also, the greater the number of estimated expression candidates Jv' (the number of free parameters) is, the greater the AIC of the variable Zs' shown in Expression (3) becomes. In a case where the recommendation device 12 generates a predictive evaluation matrix, the greater the number of estimated expression candidates Fk is, the greater computation quantity for obtaining a predictive evaluation matrix becomes, so the less the number of estimated expression candidates Fk, i.e., the number of estimated expression candidates Jv', the better. That is to say, from a point of view of computation quantity, the less the AIC of the variable Zs', the more the estimated expression candidates Jv' and linear combination coefficient candidates Bsq of the variable Zs' are suitable for estimation of an evaluation as to a content of a user.

Consequently, the smaller the AIC of the variable Zs', the higher an evaluation as to the estimated expression candidates Jv' and linear combination coefficient candidates Bsq obtained regarding the variable Zs' thereof, which is suitable as an estimated expression and linear combination coefficient.

In step S199, upon the AIC of the variable Zs' being calculated, the processing proceeds to step S200.

Also, in a case where determination is made in step S194 that with the variable Zs', the number of use situations which are "used" is not at or below the upper limit number Kmax of the number K of estimated expressions, the processing in steps S195 through S199 is skipped, and the processing proceeds to step S200.

That is to say, in a case where with the variable Zs', the number of use situations which are "used" is above the upper limit number Kmax, upon generating an estimated expression by employing an estimation result of which the use situation is "used", the number of generated estimated expressions exceeds the upper limit number Kmax of estimated expressions. Therefore, in a case where the number of use situations which are "used" is above the upper limit number Kmax, the processing in steps S195 through S199 is skipped.

Upon the AIC being calculated in step S199, or upon determination being made that the number of use situations which are "used" is above the upper limit number Kmax, in step S200 the combination coefficient calculating unit 114 determines whether or not all of the estimated expression candidates Js have been selected. Specifically, in a case where all of the S estimated expression candidates Js have been selected in the processing in step S192, determination is made that all of the estimated expression candidates have been selected.

In a case where determination is made in step S200 that all of the S estimated expression candidates Js have not been selected yet, the processing returns to step S192, where the above-mentioned processing is repeated. Specifically, the next estimated expression candidate Js is selected, and with the variable Zs' so far, the use situation of the estimation result Hs corresponding to the newly selected estimated expression candidate Js has been inverted, which is taken as a new variable Zs'. Subsequently, with regard to the variable Zs' corresponding to the selected estimated expression candidate Js, the linear combination coefficient candidates Bsq are obtained for each user group Gq, and the AIC of the variable Zs' is calculated.

On the other hand, in a case where determination is made in step S200 that all of the estimated expression candidates Js have been selected, the processing proceeds to step S201. Upon all of the estimated expression candidates J1 through JS being selected, this means that the AIC corresponding to each of the variables Z1' through ZS' corresponding to these estimated expression candidates has been obtained. Note that, more specifically, with the variable Zs', when the number of use situations having "used" exceeds the upper limit number Kmax, neither linear combination candidates and AICs are obtained.

In step S201, the selecting unit 116 selects, of the respective variables Z1' through ZS', the variable Zs' of which the obtained AIC is the minimum. Here, the estimated expression candidates Jv' and linear combination coefficient candidates Bsq of the selected variable Zs' are, of the estimated expression candidates and linear combination coefficient candidates obtained regarding the variables Z1' through ZS', to be most suitable estimated expressions and linear combination coefficients.

In step S202, the selecting unit 116 determines whether or not the AIC of the selected variable Zs' is smaller than the AIC which has been the minimum in the processing which has been performed so far. For example, the selecting unit 116 holds the variable Zs' of which the AIC is the minimum, the AIC regarding the variable Zs' thereof, the estimated expression candidates Jv', and linear combination coefficient candidates Bsq in the processing which has been performed so far. Subsequently, the selecting unit 116 compares the AIC which is the minimum this time, i.e., the AIC of the variable Zs' selected in step S201, and the held AIC.

In a case where determination is made in step S202 that the AIC of the selected variable Zs' is smaller than the AIC which has been the minimum in the processing which has been performed so far, in step S203 the combination coefficient calculating unit 114 takes the selected variable Zs' as a new variable Z. Subsequently, upon the selected variable Zs' being taken as a new variable Z, the processing returns to step S192, where the above-mentioned processing is repeated.

Specifically, in a case where the AIC of the selected variable Zs' is smaller than the past AIC, the estimated expression candidates Jv', and linear combination coefficient candidates Bsq of the variable Zs' obtained this time are more suitable estimated expressions and linear combination coefficients than the past estimated expression candidates and linear combination coefficient candidates. Accordingly, there is a possibility that the AIC of a new variable Zs' obtained by modifying the use situation of a part of the variable Zs' becomes further smaller than the AIC of the variable Zs' selected this time, and the estimated expression candidates Jv', and linear combination coefficient candidates Bsq, which are more suitable as estimated expressions and linear combination coefficients, are obtained.

Therefore, the estimated expression selecting unit 94 repeats the above-mentioned processing until the AIC is not improved with the variable Zs' selected this time as a new variable Z, i.e., until determination is made that the AIC of the selected variable Zs' is at or above the past minimum AIC.

On the other hand, in a case where determination is made in step S202 that the AIC of the selected variable Zs' is at or above the past minimum AIC, with the selected variable Zs' as a new variable Z, even if estimated expression candidates and linear combination coefficient candidates are obtained, there is a low possibility that the AIC is improved, so the processing proceeds to step S204.

In step S204, the selecting unit 116 outputs the estimated expression candidates Jv', and linear combination coefficient candidates Bsq of the variable Zs' wherein the AIC has become the minimum in the processing which has been performed so far, as the estimated expressions and linear combination coefficients of the next generation.

Specifically, the selecting unit 116 takes the V estimated expression candidates J1' through JV' as to the variable Zs' of which the AIC has become the minimum, as the estimated expressions of the next generation, and takes the linear combination coefficient candidates Bsq obtained as to the variable Zs' as the linear combination coefficients of the next generation. At this time, the linear combination coefficient candidates Bsq of the user group Gq (wherein $1 \leq q \leq Q$) to which the user Un (wherein $1 \leq n \leq N$) belongs to, i.e., the linear combination coefficients bsq0 through bsqv are taken as the linear combination coefficients of the next generation of the user Un.

The estimated expressions of the next generation thus obtained are supplied from the estimated expression selecting unit 94 to the candidate generating unit 91 and estimated expression holding unit 24, and the linear combination coefficients of the next generation for each user are supplied from the estimated expression selecting unit 94 to the estimated expression holding unit 24.

Upon the estimated expressions and linear combination coefficients of the next generation being output, the estimated expression selecting processing ends, and the processing proceeds to step S85 in FIG. 19.

Thus, the learning unit 23 generates estimated expression candidates, and assumes that some of the estimated expression candidates are employed as the estimated expressions of the next generation. Subsequently, the learning unit 23 performs an evaluation between these estimated expression candidates and the linear combination coefficient candidates corresponding to the estimated expression candidates thereof, and selects more suitable estimated expression candidates and linear combination coefficient candidates for estimation of an evaluation as to a content of a user, as the estimated expressions and linear combination coefficients of the next generation.

Thus, more suitable estimated expression candidates and linear combination coefficient candidates are selected by performing generation of an estimated expression candidate, and performing evaluations of estimated expression candidates and linear combination coefficient candidates, repeatedly, whereby an estimated expression and linear combination coefficient can be obtained, which can estimate an evaluation as to a content of a user with more precision each time the estimated expression selecting processing is performed.

Specifically, in order to estimate an evaluation as to a content of a user, a more suitable collaborative filtering algorithm, i.e., an estimated expression can be readily established, and evaluation estimation precision can be readily improved. The evaluations of a combination of estimated expression candidates, and linear combination coefficient candidates are performed, more suitable estimated expression candidates and linear combination coefficient candidates are selected and taken as the estimated expressions and linear combination coefficients of the next generation, whereby the estimation precision of an evaluation as to a content of a user can be further improved. Thus, a recommendation algorithm can be established wherein an evaluation as to a user is estimated with more precision, easily and rapidly.

Also, according to the learning unit 23, at the time of establishment of a recommendation algorithm, i.e., at the time of generating an estimated expression and linear combination coefficient, the user (administrator) does not have to perform operations. Particularly, in a case where a part of a recommendation algorithm has to be modified, for example, even in a case where the user reevaluates a content, in a case where a new content is added as an evaluation target, or the like, according to the learning processing by the learning unit 23, a suitable estimated expression and linear combination coefficient are obtained without manpower. That is to say, the administrator does not have to reestablish the recommendation algorithm.

Note that description has been made so far wherein the number K of estimated expressions is at or below the upper limit number Kmax. Accordingly, in a case where the number K of estimated expressions is 1, a linear combination coefficient bn1 to be multiplied as to a temporary user predictive matrix Tn1, a temporary predictive matrix multiplied by a linear combination coefficient, i.e., a linear combination coefficient bn0 to be added to a predictive evaluation value, are generated. Also, in a case where the number K of estimated expressions is 1, the linear combination coefficient bn0 may be set to 0 constantly.

Further, in a case where the number K of estimated expressions is 1, a predictive evaluation matrix may be obtained by employing not a linear combination coefficient but the estimated expression F1 alone. In such a case, the evaluations of estimated expression candidates are performed with the user evaluation matrix and estimation result Hs, and of multiple estimated expression candidates, the smaller the error between the predictive evaluation value obtained with an estimated expression candidate, and the actual previously-input evaluation value is, the higher the evaluation thereof.

Also, the above-mentioned series of processing can be executed by not only hardware but also software. In the case of executing the series of processing by software, a program making up the software thereof is installed from a program recording medium to a computer embedded in dedicated hardware, or a general-purpose personal computer or the like capable of executing various types of function by various types of program being installed.

FIG. 28 is a block diagram illustrating a configuration example of a computer wherein the above-mentioned series of processing is executed by the program. With the computer, a CPU (Central Processing Unit) 201, ROM (Read Only Memory) 202, and RAM (Random Access Memory) 203 are connected mutually by a bus 204.

An input/output interface 205 is further connected to the bus 204. The input/output interface 205 is connected with an input unit 206 made up of a keyboard, mouse, microphone and so forth, an output unit 207 made up of a display, speaker, and so forth, a recording unit 208 made up of a hard disk, nonvolatile memory, and so forth, a communication unit 209 made up of a network interface and so forth, and a drive 210 for driving a removable medium 211 such as a magnetic disk, optical disc, magneto-optical disk, semiconductor memory, or the like.

With the computer thus configured, the above-mentioned series of processing is performed, for example, by the CPU 201 loading a program stored in the recording unit 208 in the RAM 203 through the input/output interface 205 and bus 204 and executing this.

The program executed by the computer (CPU 201) may be provided by being recorded in the removable medium 211 which is a package medium made up of a magnetic disk (including a flexible disk), optical disc (CD-ROM (Compact Disc-Read Only Memory), DVD (Digital Versatile Disc), etc.), magneto-optical disk, semiconductor memory, or the like, or provided through a cable or wireless transmission medium such as a local area network, Internet, or digital satellite broadcasting.

Subsequently, the removable medium 211 is mounted on the drive 210, whereby the program can be installed in the recording unit 208 through the input/output interface 205. Also, the program can be received at the communication unit 209 through a cable or wireless transmission medium, and installed in the recording unit 208. Alternatively, the program can be installed in the ROM 202 or recording unit 208 beforehand.

Note that the program executed by the computer may be a program wherein processing is performed in time sequence along the order described in the present Specification, or may be a program wherein processing is performed in parallel or at appropriate timing such that calling is performed. Also note that embodiments of the present invention are not restricted to the above-mentioned embodiment, and various modifications may be made without departing from the essence and scope of the present invention.

The present application contains subject matter related to that disclosed in Japanese Priority Patent Application JP 2008-111120 filed in the Japan Patent Office on Apr. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device which, based on an initial estimated expression made up of a plurality of operators including an operator for performing computation of collaborative filtering which employs computation and an initial evaluation matrix made up of evaluation values indicating an evaluation for each of a plurality of users as to each of a plurality of targets, some of which targets are evaluated generates a new estimated expression to be employed for estimation of evaluation values of unevaluated targets included in said targets which have not been evaluated by said users, said information processing device comprising:
  estimated expression candidate generating means configured to take said initial estimated expression and generate a new estimated expression wherein a portion of said initial estimated expression is modified, and an arbitrary new estimated expression, generated by combining operators selected randomly, as estimated expression candidates;
  estimation result generating means configured to estimate an evaluation value as to each of said plurality of evaluation targets for each of said users for each of said estimated expression candidates based on
    said estimated expression candidates and
    said initial evaluation matrix
  to generate estimation results made up of predictive evaluation values that form a new evaluation matrix for each estimated expression candidate;
  evaluating means configured to calculate an evaluation of each of said estimated expression candidates based on said estimation results and said new evaluation matrixes; and
  selecting means configured to select the estimated expression candidate having the highest evaluation calculated by said evaluating means, of said estimated expression candidates, as the new estimated expression to be employed for estimation of evaluation values of said unevaluated targets.

2. The information processing device according to claim 1, wherein:
  final estimation results of said evaluation values of said unevaluated targets are obtained by multiplying said predictive evaluation value of each unevaluated target by a predetermined coefficient; and
  wherein said evaluating means includes
    coefficient calculating means configured to obtain said coefficients, and
    information quantity reference calculating means configured to calculate information quantity reference as an evaluation as to said estimated expression candidates and said coefficients; and
  wherein said selecting means select said estimated expression candidate having the highest evaluation based on said information quantity reference.

3. The information processing device according to claim 2, wherein:
  the final estimation results of said evaluation values of said unevaluated targets are obtained by subjecting each of said predictive evaluation values of said unevaluated targets obtained with a plurality of said estimated expressions and said coefficients to linear combination.

4. The information processing device according to claim 3, wherein:
  said coefficient calculating means employs said evaluation value and said predictive evaluation value of users belonging to the same group for each of a plurality of user groups to obtain said coefficients for each of said groups.

5. An information processing method for information processing which, based on an initial estimated expression made up of a plurality of operators including an operator for performing computation of collaborative filtering which employs computation and an initial evaluation matrix made up of evaluation values indicating an evaluation for each of a plurality of users as to each of a plurality of targets, some of which targets are evaluated generates a new estimated expression to be employed for estimation of evaluation values of unevaluated targets included in said targets which have not been evaluated by said users, said information processing method comprising:
  using said initial estimated expression to generate a new estimated expression wherein a portion of said initial estimated expression is modified, and an arbitrary new estimated expression, generated by combining operators selected randomly, as estimated expression candidates;
  estimating an evaluation value as to each of said plurality of evaluation targets for each of said users for each of said estimated expression candidates based on
    said estimated expression candidates and
    said initial evaluation matrix
  and generating estimation results made up of predictive evaluation values that form a new evaluation matrix for each estimated expression candidate;
  evaluating each of said estimated expression candidates based on said estimation results and said new evaluation matrixes; and
  selecting the estimated expression candidate having the highest evaluation of said estimated expression candidates, as the new estimated expression to be employed for estimation of evaluation values of said unevaluated targets.

6. A program stored in a program recording medium for information processing which, based on an initial estimated expression made up of a plurality of operators including an operator for performing computation of collaborative filtering which employs computation and an initial evaluation matrix made up of evaluation values indicating an evaluation for each of a plurality of users as to each of a plurality of targets, some of which targets are evaluated generates a new estimated expression to be employed for estimation of evaluation values of unevaluated targets included in said targets which have not been evaluated by said users, said program causing a computer to execute processing including the steps of:

using said initial estimated expression to generate a new estimated expression wherein a portion of said initial estimated expression is modified, and an arbitrary new estimated expression, generated by combining operators selected randomly, as estimated expression candidates;

estimating an evaluation value as to each of said plurality of evaluation targets for each of said users for each of said estimated expression candidates based on
said estimated expression candidates and
said initial evaluation matrix
and generating estimation results made up of predictive evaluation values that form a new evaluation matrix for each estimated expression candidate;

evaluating each of said estimated expression candidates based on said estimation results and said new evaluation matrixes; and selecting the estimated expression candidate having the highest evaluation calculated of said estimated expression candidates, as the new estimated expression to be employed for estimation of evaluation values of said unevaluated targets.

7. An information processing device which, based on an initial estimated expression made up of a plurality of operators including an operator for performing computation of collaborative filtering which employs computation and an initial evaluation matrix made up of evaluation values indicating an evaluation for each of a plurality of users as to each of a plurality of targets, some of which targets are evaluated generates a new estimated expression to be employed for estimation of evaluation values of unevaluated targets included in said targets which have not been evaluated by said users, comprising a processor comprising:

an estimated expression candidate generating unit configured to take said initial estimated expression and generate a new estimated expression wherein a portion of said initial estimated expression is modified, and an arbitrary new estimated expression, generated by combining operators selected randomly, as estimated expression candidates;

an estimation result generating unit configured to estimate an evaluation value as to each of said plurality of evaluation targets for each of said users for each of said estimated expression candidates based on
said estimated expression candidates and
said initial evaluation matrix
to generate estimation results made up of predictive evaluation values that form a new evaluation matrix for each estimated expression candidate;

an evaluating unit configured to calculate an evaluation of each of said estimated expression candidates based on said estimation results and said new evaluation matrixes; and selecting unit configured to select the estimated expression candidate having the highest evaluation calculated by said evaluating unit, of said estimated expression candidates, as the new estimated expression to be employed for estimation of evaluation values of said unevaluated targets.

* * * * *